(12) United States Patent
Mori et al.

(10) Patent No.: US 6,320,639 B1
(45) Date of Patent: *Nov. 20, 2001

(54) LIQUID CRYSTAL DEVICE AND PROCESS FOR PRODUCTION THEREOF

(75) Inventors: Sunao Mori, Utsunomiya; Takashi Enomoto, Sagamihara; Toshifumi Yoshioka, Hiratsuka; Yasuyuki Watanabe, Atsugi; Kazuhiro Aoyama, Atsugi; Junji Kawasaki, Atsugi; Kouki Nukanobu, Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,160

(22) Filed: Mar. 6, 1997

(30) Foreign Application Priority Data

| Mar. 11, 1996 | (JP) | ................................................. | 8-053505 |
| Jul. 26, 1996 | (JP) | ................................................. | 8-197955 |
| Jul. 26, 1996 | (JP) | ................................................. | 8-197957 |

(51) Int. Cl.⁷ ....................... G02F 1/1339; G02F 1/1337; G02F 1/141
(52) U.S. Cl. ........................... 349/155; 349/129; 349/133
(58) Field of Search ................................ 349/105, 173, 349/172, 106, 110, 129, 133, 126, 155

(56) References Cited

U.S. PATENT DOCUMENTS

| 4,277,144 | 7/1981 | Saurer et al. . |
| 4,295,712 | * 10/1981 | Ishiwatari .............................. 349/156 |
| 4,367,924 | 1/1983 | Clark et al. ............................ 350/334 |
| 4,422,731 | * 12/1983 | Droguet et al. ....................... 349/155 |
| 4,470,667 | 9/1984 | Okubo et al. ...................... 350/339 F |
| 4,917,471 | * 4/1990 | Takao et al. ....................... 350/339 F |
| 5,000,545 | 3/1991 | Yoshioka et al. ..................... 350/336 |
| 5,095,379 | * 3/1992 | Fukunaga et al. ...................... 359/68 |
| 5,132,816 | * 7/1992 | Itoh et al. ............................... 359/56 |
| 5,150,233 | 9/1992 | Enomoto et al. ....................... 359/54 |
| 5,223,963 | 6/1993 | Okada et al. ........................... 359/78 |
| 5,285,300 | 2/1994 | Suzuki et al. ........................... 359/54 |
| 5,303,076 | 4/1994 | Okada et al. ........................... 359/78 |

(List continued on next page.)

FOREIGN PATENT DOCUMENTS

| 0485017 | 5/1992 | (EP) . |
| 0509490 | 10/1992 | (EP) . |
| 0535892 | 4/1993 | (EP) . |
| 0622657 | 11/1994 | (EP) . |
| 0636920 | 2/1995 | (EP) . |
| 2420802 | 10/1979 | (FR) . |
| 2023864 | 1/1980 | (GB) . |
| 57113265 | 7/1982 | (JP) . |
| 62144133 | 6/1987 | (JP) . |
| 03249623 | 11/1991 | (JP) . |
| 4127126 | 4/1992 | (JP) . |
| 05005886 | 1/1993 | (JP) . |
| 5102754 | 4/1993 | (JP) . |
| 07092467 | 4/1995 | (JP) . |

*Primary Examiner*—William L. Sikes
*Assistant Examiner*—Tarifur R. Chowdhury
(74) *Attorney, Agent, or Firm*—Fitzpatrick, Cella, Harper & Scinto

(57) ABSTRACT

A matrix-type liquid crystal device is formed so as to have a matrix of pixels defined by and isolated from each other by an outside-pixel region. The liquid crystal in the outside-pixel region in placed in an alignment state, typically a homeotropic state or one close thereto, which is different from an alignment state, typically a homogeneous uniform alignment state, at the pixel region. As a result, the liquid crystal device is provided with improved display qualities due to suppression of irregularities at the outside-pixel region and/or a local pressure distribution.

9 Claims, 17 Drawing Sheets

U.S. PATENT DOCUMENTS

| | | | |
|---|---|---|---|
| 5,323,252 | 6/1994 | Yoshida et al. | 359/54 |
| 5,361,153 | 11/1994 | Shimamune et al. | 359/87 |
| 5,381,256 | 1/1995 | Hanyu et al. | 359/75 |
| 5,406,398 | 4/1995 | Suzuki et al. | 359/80 |
| 5,412,494 | 5/1995 | Ishiwata et al. | 359/67 |
| 5,452,114 | 9/1995 | Hotta et al. | 359/75 |
| 5,467,209 | 11/1995 | Hotta et al. | 359/74 |
| 5,499,128 * | 3/1996 | Hasegawa et al. | 349/155 |
| 5,541,752 | 7/1996 | Taniguchi et al. | 359/78 |
| 5,680,187 * | 10/1997 | Nagayama et al. | 349/156 |
| 5,748,266 * | 5/1998 | Kodate | 349/155 |
| 5,777,707 * | 7/1998 | Masaki et al. | 349/110 |

* cited by examiner 96a 96b 97a 97b
(SPLAY) (UNIFORM)

98a 98b

LIQUID CRYSTAL DEVICE AND PROCESS FOR PRODUCTION THEREOF

FIELD OF THE INVENTION AND RELATED ART

The present invention relates to a liquid crystal device having a pixel region and an outside-pixel region providing different liquid crystal alignment states allowing improved performances and a process for production thereof, particularly such a liquid crystal device using a liquid crystal having bistability, such as a chiral smectic liquid crystal, and a process for production thereof.

A liquid crystal device of a type which controls transmission of light by utilizing the refractive index anisotropy of liquid crystal molecules in combination with a polarizing device has been proposed by Clark and Lagerwall (U.S. Pat. No. 4,367,924). The liquid crystal used in the liquid crystal device is generally a bistable liquid crystal, such as a chiral smectic liquid crystal which has chiral smectic C phase (Sm*C) or H phase (Sm*H) in specific temperature range and, under this state, shows a property of taking either one of a first optically stable state and a second optically stable state in response to an electric field applied thereto and maintaining such a state in the absence of an applied electric field, namely bistability, and also has a quick responsiveness to a change in the electric field. Accordingly, such a chiral smectic liquid crystal device (ferroelectric liquid crystal device) is expected to be widely utilized as a high-speed and memory-type display device.

Further, in recent years, a study on a bistable twisted-nematic (BTN)-type liquid crystal device using a liquid crystal in chiral nematic phase (N*) has been made.

Such a liquid crystal device is generally constituted by disposing, e.g., a chiral smectic liquid crystal between scanning electrodes and data electrodes constituting in combination an electrode matrix, and driven according to a multiplexing drive scheme of sequentially applying a scanning signal to the scanning electrodes and applying data signals to the data electrodes in synchronism with the scanning signal to change the orientation states of liquid crystal, i.e., turn on or off the liquid crystal, at pixels.

Such a liquid crystal device generally has a structure including a pair of substrates which have electrodes and optionally drive elements thereon and are provided with some aligning treatment, and a liquid crystal sandwiched between the substrates. As a result, such a liquid crystal device is provided with a plurality of display pixels (hereinafter simply referred to as "pixel(s)") functioning to effect a data display independently from each other and a separation region (hereinafter called "outside-pixel region") separating adjacent pixels and allowing such an independent data display. The outside-pixel region may include a pixel-spacing region for electrically isolating the pixels from each other where no transparent electrodes or metal electrodes are present, and a region not effective for display where auxiliary metal electrodes, etc., are disposed, e.g., for preventing a delay in electrical signal transmission liable to occur accompanying a size enlargement of liquid crystal device. In the case where such auxiliary metal electrodes are not provided, the outside-pixel region and the pixel-spacing region are identical to each other.

Incidentally, when such a liquid crystal device is driven according such a multiplexing drive scheme, the liquid crystal in, e.g., an outside-pixel region 80c between pixels 80a and 80b as shown in FIG. 22 assumes an ununiform mixture alignment state including white and black domains 81a and 81b due to influence of molecular alignments in the pixels 80a and 80b representing a white-displaying pixel and a black-displaying pixel, respectively. The presence of such mixture domains 81a and 81b in an outside-pixel region 80c is liable to result in a low-quality picture giving a rough appearance as a whole.

The above difficulty is presumably caused by a phenomenon that it is difficult for the liquid crystal at the outside-pixel region 80c to have an alignment state (principally, a pretilt) which is remarkably different from those at the pixels 80a and 80b, and the liquid crystal at the outside-pixel region 80c is caused to have a bistable alignment state similarly as at the pixels 80a and 80b, thus resulting in locally ununiform regions leading to a rough appearance of picture as a whole. This difficulty is also encountered in case where a bistable chiral nematic liquid crystal is subjected to multiplexing drive.

On the other hand, in order to suppress such a rough display appearance, it has been practiced to dispose a (light-)masking or shade layer at the outside-pixel region. If the masking layer is formed as a metal film, the formation and photolithographic steps for patterning thereof incur an increase in production cost. Further, it is well known that a liquid crystal device using a bistable liquid crystal is rather vulnerable to an impact, and the fixation of the substrates for alleviating the difficulty is also liable to incur a production cost increase.

Further, a chiral smectic liquid crystal device, such as a ferroelectric liquid crystal device requires a small cell gap (gap between the substrates) on the order of 1 $\mu$m—several $\mu$m and, when a liquid crystal device is enlarged in a planar size while keeping such a small cell gap, it becomes critically important to provide the device with a liquid crystal layer in a uniform thickness, i.e., a uniform cell gap, in order to ensure a uniform display over an entire effective optical modulation area (an entire display area in case of a display device).

Accordingly, in order to provide a liquid crystal device capable of a uniform display over the entire area, it has been generally practiced to disperse spacer beads 14p of a uniform diameter in the device as shown in FIG. 23. Further, as the liquid crystal device is further enlarged in area, it becomes difficult to retain a uniform cell gap in a central region of the device by holding substrates 11aa and 11bb to each other only at their peripheries, so that it has been also practice to disperse a particulate adhesive resin 15p within the liquid crystal device so as to adhere to the substrates 11aa and 11bb, thereby preventing the cell gap from expanding in excess of the spacer diameter and retaining a uniform gap.

As shown in FIG. 24 which is a sectional view taken along a line X-Y in FIG. 23, in such a conventional liquid crystal device, a stepwise unevenness appears at a boundary region (encircled by an oval OV in FIG. 24) between an auxiliary metal electrode 19p provided for alleviation of signal transmission delay along an edge of a transparent electrode 12aa or 12bb constituting a pixel P for data display and a pixel-spacing region for electrically separating adjacent pixels.

When an alignment film 13aa or 13bb covering such a stepwise unevenness on the substrate 11aa or 11bb is subjected to rubbing as a uniaxial aligning treatment generally used at present, there arises a difference in pretilt angles caused in the respective regions.

More specifically, when the alignment films 13aa and 13bb are subjected to a uniaxial aligning treatment, such as rubbing in a direction A as shown in FIG. 25, an elevated portion MP is subjected to a stronger rubbing and a depressed portion WP is subjected to a weaker rubbing, respectively compared with a pixel region, thus resulting in a high and low pretilt distribution and a discontinuous alignment characteristic.

When such a pixel P accompanied with a discontinuous alignment characteristic is driven for display by applying drive signals to the transparent electrodes 12aa and 12bb, a portion 17A of the liquid crystal above the auxiliary metal electrode 19s is supplied with a stronger electric field to cause an earlier memory state disorder or premature switching than a portion 17B of the liquid crystal at the pixel P. Further, the disorder generates a domain in a state opposite to the stable state in the pixel, which domain is grown from the boundary region (denoted by an oval OV in the figure) between the pixel region and the pixel-spacing region in a direction R to also cause a disorder of display at the pixel P.

Further, even in the case of an alignment control film obtained through a uniaxial aligning treatment other than rubbing, a large electric field in applied to the liquid crystal layer above the auxiliary metal electrode than at the pixel, so that the disorder of a memory characteristic is liable to be caused, thus providing a narrower voltage range allowing a normal display (i.e., a narrower voltage margin) to provide a lower drive performance as a display device.

As a solution for removing such a stepwise unevenness, it has been practiced to dispose a smoothening layer below the alignment film. However, the provision of such a smoothing layer can result in an electrical discontinuity at a pixel-spacing region, thus resulting in accelerated alignment defects and memory disorder to cause inferior display performances. Another method of smoothening by abrasion can result in a lower production yield due to occurrence of refuse.

Now, in order to facilitate the recognition of effects of suppressing alignment defects and drive defects described herein, the alignment of and drive of a ferroelectric liquid crystal used in the present invention will be supplemented.

The alignment states of a ferroelectric liquid crystal may be roughly divided into two types of C1 and C2, which may be explained by a difference in chevron structure of smectic layers as shown in FIG. 26. Referring to FIG. 26, reference numeral 91 denotes a smectic layer showing ferroelectricity, 92 denotes a C1 alignment region, and 93 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 11a and 11b (chevron structure) as shown in FIG. 26.

The bending of the layers 91 can be caused in two ways corresponding to the C1 and C2 alignment as shown. As is well known, liquid crystal molecules at the substrate surfaces are aligned to form a certain angle a (pre-tilt) as a result of rubbing in a direction A in such a manner that their heads (leading ends) in the rubbing direction are up (or away) from the substrate surfaces 11a and 11b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 26 is viewed in plan as shown in the upper part of FIG. 26, a boundary 94 of transition from C1 alignment (92) to C2 alignment (93) in the rubbing direction A looks like a zigzag lightning and is called a lightning defect, and a boundary 95 of transition from C2 alignment (93) to C1 alignment (92) forms a broad and moderate curve and is called a hairpin defect.

When such a ferroelectric liquid crystal is disposed between a pair of substrates 11a and 11b and placed in an alignment state satisfying a relationship of $\widehat{H}<\alpha+\delta$... (1), wherein a denotes a pretilt angle of the FLC, $\widehat{H}$ denotes a tilt angle (a half of cone angle), and $\delta$ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $\widehat{H}>\theta_a>\widehat{H}/2$... (2) are inclusively referred to as a uniform state.

In the uniform state, the directors are believed to be not twisted between the substrates in view of optical properties thereof. FIG. 27A is a schematic view illustrating director positions between the substrates in the respective states in C1 alignment. More specifically, at 96a, 96b, 97a and 97b are respectively shown changes in director positions between the substrates in the form of projections of directors onto cone bottoms as viewed from each bottom. At 96a and 96b is shown a splay state, and at 97a and 97b is shown a director arrangement which is believed to represent a uniform alignment state. As is understood from FIG. 27A, at 97A and 97B representing a uniform state, the molecule position (director) is different from that in the splay state either at the upper substrate or lower substrate. FIG. 27B shows two states in C2 alignment between which no switching is observed at the boundaries but an internal switching is observed. The uniform state in C1 alignment provides a larger tilt angle $\theta_a$ and thus a higher brightness and a higher contrast than the conventionally used bistable state in C2 alignment.

In a liquid crystal device using a ferroelectric liquid crystal placed in a uniform state providing bistable states 97a and 97b, a switching from one stable state to the other stable state can be caused by application of an electric field of a polarity exceeding a certain threshold, and a reverse switching can be caused by application of an electric field of an opposite polarity.

However, when the electric field is increased from such a threshold, i.e., a lowest electric field intensity allowing a reciprocation between the two stable states, to exceed a certain electric field intensity, the liquid crystal state is returned from a desired written state to a former stable state. This phenomenon has been observed by us and, from this fact, a drive condition suitable for data transmission or display is determined by a width or difference between such threshold electric fields. In other words, it has been confirmed by us that the phenomenon of restoration from a desired molecular position to an original stable position strongly depends on the applied electric field and the liquid crystal alignment state.

In view of the recognized phenomena and the liquid crystal device structure shown in FIG. 25 in combination, as the liquid crystal layer thickness at the auxiliary metal electrode 19s is smaller than the liquid crystal layer thickness at the pixel P, the electric field intensity at the liquid crystal layer 17A can reach a threshold value for causing the restoration from a desired written state to the original stable state (this phenomenon being referred to as "memory characteristic disorder") even if the electric field at the pixel P is within a suitable drive voltage range. The memory characteristic disorder at the auxiliary metal electrode is liable to affect the memory characteristic within the pixel P and gradually cause a memory characteristic disorder in the pixel P.

Further, as described above, when the alignment films 13aa and 13bb accompanied with unevennesses are subjected to rubbing, the rubbing intensities are changed to result in a pretilt distribution and a discontinuity in alignment characteristic. It has been confirmed by us that the above-mentioned lowest electric field (threshold) for causing reciprocal switching between two stable states and the electric field intensity causing the memory characteristic disorder depend on the controlling power of the alignment films 13aa and 13bb, so that the pretilt distribution, i.e., the controlling power distribution, arising from the unevennesses, has provided a factor for narrowing the voltage margin allowing a uniform and stable drive of a liquid crystal device.

Further, another difficulty has been found that, when a liquid crystal device as shown in FIG. 28 containing a ferroelectric liquid crystal (chiral smectic liquid crystal) is driven continuously for a long period, the liquid crystal molecules disposed between a pair of substrates 101 and 102 respectively subjected to rubbing in a direction A are moved in a specific direction (leftward in the case of FIG. 28) to provide an edge region 103 (hatched in FIG. 28) tinged in yellow because of an increased liquid crystal layer thickness. This phenomenon, when caused, not only provides an ugly display appearance but also results in a change in switching characteristic of liquid crystal pixels. This phenomenon noticeably occurs particularly in a liquid crystal device utilizing a high-contrast uniform alignment state as described above.

Accordingly, in order to suppress such a liquid crystal layer thickness change due to liquid crystal molecular movement during a long hours of continuous drive, it has been proposed, e.g., to use a liquid crystal device 100 as shown in FIG. 29 including a pair of substrates 101 and 102 each subjected to rubbing in a direction A and sandwiching therebetween a ferroelectric liquid crystal (not specifically shown) to form a display region 104 and a peripheral non-display region 105 (hatched in FIG. 29, which may be regarded as a part of outside-pixel region), so that the pretilt angle (i.e., angle between a substrate and C1 director of a liquid crystal molecule) in the non-display region 105 is made larger than that in the display region 104 or the liquid crystal in the non-display region 105 is placed in a homeotropic alignment state (JP-A 5-102754, published as JP-A 7-13167).

In the liquid crystal deice 100, liquid crystal molecules 106 aligned to form a black display state region B are moved in a direction a, and liquid crystal molecules 106b aligned to form a white display region C are moved in a direction b but the peripheral non-display region 105 allows an isotropic movement of liquid crystal molecules 106 to alleviate a pressure distribution caused by liquid crystal movement occurring in the respective written regions B and C and suppress a liquid crystal layer thickness change due to the liquid crystal molecular movement.

However, such a liquid crystal device 100 as shown in FIG. 29 is caused to have a larger size relative to an effective display area due to provision of the non-display region 105 surrounding the display region 104.

Further, in order to provide a larger pretilt angle in the non-display region 105 than in the display region 104, a special treatment is required for the non-display region 105, thus resulting in an increased production cost. Further, in the case of displaying a region D or E as shown in FIG. 29 including a black display region B and white display region W adjacent to each other in a direction perpendicular to the rubbing direction A, it is theoretically impossible to suppress the liquid crystal layer thickness change due to liquid crystal molecular movement, i.e., impossible to suppress a pressure increase at the white (W)—black (B) boundary in the region D or a pressure decrease at the white (W)—black (B) boundary in the region E.

SUMMARY OF THE INVENTION

Accordingly, a principal object of the present invention is to provide a liquid crystal device and a process for production thereof having solved the above-mentioned problems of the prior art.

A more specific object of the present invention is to provide a liquid crystal device having a high display quality and a process for producing such a liquid crystal device in an inexpensive manner.

Another specific object of the present invention is to provide a liquid crystal device wherein the occurrence in mixture of white domains and black domains in an outside-pixel region is suppressed, and a process for production thereof.

A further object of the present invention is to provide a liquid crystal device capable of providing an improved alignment state at a pixel-spacing region and improved alignment state and drive characteristic at an electrically discontinuous region between pixels, and a process for production thereof.

A further object of the present invention is to provide a liquid crystal device capable of suppressing a liquid crystal layer thickness change due to liquid crystal molecular movement in a continuous drive for a long period, irrespective of a display pattern, and a process for production thereof.

According to a first aspect of the present invention, there is provided a liquid crystal device, comprising: a pair of substrates and a liquid crystal disposed between the substrates; said pair of substrates being provided with an alignment film uniaxially treated by rubbing for providing a prescribed alignment state of the liquid crystal, and at least two groups of electrodes intersecting each other so as to form a plurality of pixels each at an intersection of the electrodes, and an outside-pixel region separating the pixels from each other, each pixel being provided with a pixel region formed by the liquid crystal and a pair of opposing electrodes sandwiching the liquid crystal so as to apply a drive voltage for causing an optical state change of the liquid crystal, wherein the outside-pixel region is provided with a projecting structure so as to provide an alignment state of the liquid crystal which is different from that of the liquid crystal in the pixel region.

According to a second aspect of the present invention, there is provided a liquid crystal device, comprising: a pair of substrates and a liquid crystal disposed between the substrates; said pair of substrates being provided with an alignment film subjected to a uniaxial aligning treatment for providing a prescribed alignment state of the liquid crystal, and at least two groups of electrodes intersecting each other so as to form a plurality of pixels each at an intersection of the electrodes, and a pixel-spacing region electrically isolating the pixels from each other, each pixel being provided with a pixel region formed by the liquid crystal and a pair of opposing transparent electrodes sandwiching the liquid crystal so as to apply a drive voltage for causing an optical state change of the liquid crystal, wherein the liquid crystal at the pixel-spacing region is placed in a state not driven (i.e., a state causing no switching between stable states) when the drive voltage is applied to the opposing transparent electrodes for causing the optical state change of the liquid crystal at the pixel region.

According to a third aspect of the present invention, there is provided a liquid crystal device, comprising: a pair of substrates and a liquid crystal disposed between the substrates; said pair of substrates being provided with an alignment film for providing a prescribed alignment state of the liquid crystal, and at least two groups of electrodes intersecting each other so as to form a plurality of pixels each at an intersection of the electrodes, and an outside-pixel region separating the pixels from each other, each pixel being provided with a pixel region formed by the liquid crystal and a pair of opposing electrodes sandwiching the liquid crystal so as to apply a drive voltage for causing an optical state change of the liquid crystal, at least one of said pair of opposing transparent electrodes is further provided with a metal electrode along a portion of the associated transparent electrode outside the pixel region, and the metal electrode is surface-roughened to provide a pretilt angle of the liquid crystal above the metal electrode which is larger than a pretilt angle of the liquid crystal at the pixel region free from the metal electrode.

The present invention further provides processes for providing the above-mentioned liquid crystal devices.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
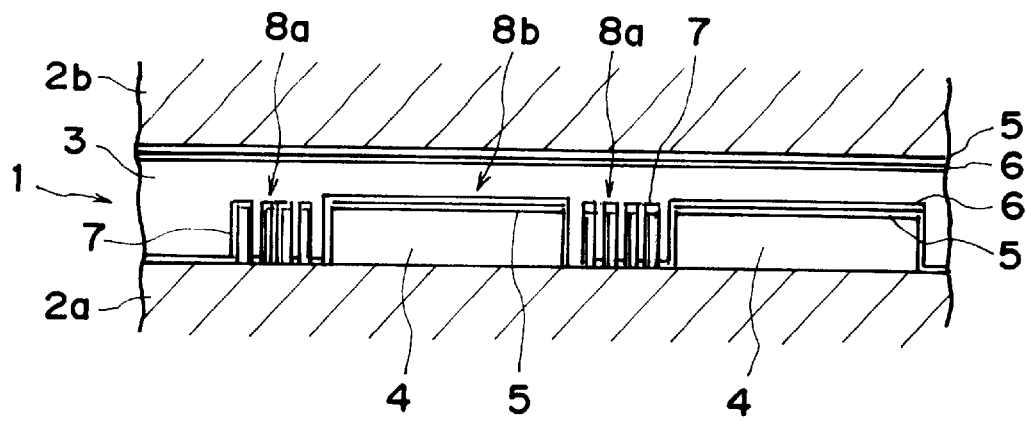
FIG. 1 is a schematic sectional view of a liquid crystal device according to a first embodiment of the invention.

FIG. 1 is a sectional view for illustrating a structure of a liquid crystal device according to a first embodiment of the present invention. Referring to FIG. 1, a liquid crystal device 1 includes a pair of glass plates (substrates) 2a and 2b for sandwiching a liquid crystal 3, such as a chiral smectic liquid crystal, color filter segment(s) (hereinafter simply referred to as "color filter(s)") 4 formed on one substrate 2a, transparent electrodes 5 disposed on both substrates for applying drive voltages to the liquid crystal 3, and alignment films 6 provided with a uniaxial alignment characteristic, e.g., by rubbing. The transparent electrodes 5 are disposed on both substrates 2a and 2b so as to intersect each other to form an electrode matrix in combination for multiplexing drive of the liquid crystal 3.

According to this embodiment, the liquid crystal device 1 further includes a minute pattern of projecting structure 7 formed at an outside-pixel region 8a outside pixel regions 8b defined corresponding to color filters 4. According to the projecting structure 7, the liquid crystal 3 at the outside-pixel region 8a is placed in an alignment state which is different from that at the pixel regions 8b, e.g., in an asymmetrical alignment state or a homeotropic alignment state, to be monostabilized between the substrates 2a and 2b. In this embodiment, the projecting structure 7 is formed of a material identical to that of the color filters 4 and simultaneously with the formation of the color filters 4 so as reduce the numbers of production steps and materials used. The projecting structure 7 may be colorless or colored and, in the latter case, may preferably be formed of a blue color filter material.

As the alignment of the liquid crystal 3 at the outside-pixel region 8a is fixed by monostabilization due to the projecting structure 7, even when the liquid crystal 3 at the pixel regions in proximity is driven, the liquid crystal molecular alignment change at the outside-pixel region 8a may be prevented, thus allowing a high-quality picture display free from roughness.

Figure 2A:
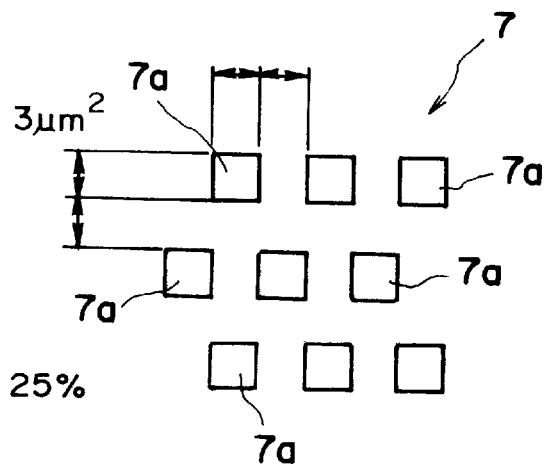
FIGS. 2A and 2B are schematic plan views each illustrating an example of minute projecting structure formed at an outside-pixel region of the liquid crystal device shown in FIG. 1.
Figure 2B:
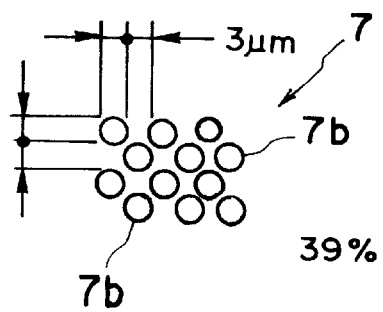

The projecting structure 7 may for composed in any shapes, for example, of rectangular or square pillars of, e.g., 3 $\mu m^2$ in planar area as shown in FIG. 2A, cylindrical pillars of, e.g., 3 $\mu m$ in diameter as shown in FIG. 2B, or rectangular or stripe-shaped bars (not shown). These structure may also be called vertical structures but the projecting structure can also assume a non-vertical structure, such as a hemisphere. The projecting structure 7 may preferably occupy 4–50%, of a total planar area of the outside-pixel region in consideration of the patterning accuracy and the homogeneous alignment domain size possibly resisting and disturbing the surrounding homeotropic alignment in the outside-pixel region. FIG. 2A shows the case of 25%, and FIG. 2B shows the case of 39%.

Generally, the projecting structure is provided so as to obstruct-the effect of rubbing for providing a bistable homogeneous alignment state, when a substrate is subjected to rubbing, and to leave a homeotropic alignment state (i.e., providing a pretilt of at least 70 deg. herein) or a monostable homogeneous alignment state at the outside-pixel region, the projecting (preferably vertical) structure (7a or 7b) may have a height of 200 Å to 3 $\mu m$ (up to a cell gap) and a planar size (diameter or unidirectional length) of 200 Å–4 $\mu m$ may preferably be disposed at a uniform pitch which may preferably be in the range of ⅓–⅕ of the pixel spacing. The projecting structure may preferably be formed at a uniform density for four sides of pixel-spacing region surrounding a pixel of which two sides may ordinarily be on one substrate and the remaining two sides may be on the other substrate.

Some specific examples of production of liquid crystal devices having an organization as described above will now be described.

EXAMPLE 1

One glass substrate (1.1 mm-thick blue sheet glass of 300 mm×320 mm) was subjected to three color filter forming cycles each including spin-coating with a color filter-forming agent ("CFPR Series", available from Tokyo Ohka Kogyo K.K.), pre-baking at 100° C. for 2 min., exposure to ultraviolet rays at 200 mJ, showering development with an alkaline developer liquid for 40 sec. and post-baking at 250° C. for 5 min., to form 1.5 $\mu m$-thick color filters 4 of red, green and blue and vertical structure pieces 7 formed simultaneously with the blue color filters.

Then, the color filters 4 and the vertical structure 7 were laminated with transparent electrodes 5 and then coated with a polyimide precursor liquid ("LQ-1800", available from Hitachi Kasei K.K.), followed by baking at 270° C. for 10 min. to form a 200 Å-thick polyimide alignment film 6, which was then rubbed in one direction at such an intensity as to provide a pretilt-angle of ca. 20 deg.

Another substrate 2b was treated in the same manner as above except for omitting the steps of forming the color filters 4 and the vertical structure 7. Then, the thus-treated substrates 2a and 2b were applied to each other with an epoxy adhesive and with silica spacer beads of 1 $\mu m$ in diameter dispersed therebetween so that the rubbing direction for both substrates cross at an angle of −8 deg. (the rubbing direction for a lower substrate was rotated by 8 deg in a counterclockwise direction from the rubbing direction for an upper substrate as viewed from the upper substrate), thereby forming a blank device, which was then filled with a pyrimidine-based mixture liquid crystal 3 showing the following phase transition series to obtain a liquid crystal device 1.

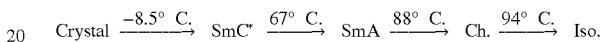

$$\text{Crystal} \xrightarrow{-8.5°\text{ C.}} \text{SmC*} \xrightarrow{67°\text{ C.}} \text{SmA} \xrightarrow{88°\text{ C.}} \text{Ch.} \xrightarrow{94°\text{ C.}} \text{Iso.}$$

As a result of polarizing microscopic observation, the liquid crystal in the thus-prepared liquid crystal device 1 exhibited a uniform alignment showing a desired bistable alignment characteristic at the pixel region 8b and a monostably dark alignment state at the outside-pixel region 8a presumably due to a fixed hybrid alignment of a homeotropic alignment on the substrate 2a to a homogeneous alignment on the substrate 2b. As a result, the liquid crystal device provided a high-quality picture display free from rough appearance.

EXAMPLE 2

A chiral nematic liquid crystal device was prepared in the following manner.

Two substrates 2a and 2b were treated in the same manner as in Example 1 up to the formation of the color filters 4, the vertical structure 7 at the outside-pixel region 8a and the transparent electrodes 5. Then, each substrate was coated with a polyimide alignment film 6 ("SE-3140", available from Nissan Kagaku K.K.), followed by rubbing.

The thus-treated two substrates 2a and 2b were then applied to each other with spacer beads dispersed therein so as to provide a gap of 2 $\mu m$ therebetween and so that their rubbing directions were parallel and opposite to each other.

Separately, a chiral nematic liquid crystal 3 having a helical H pitch of 3.4 $\mu m$ was prepared by adding an optical dopant to a nematic liquid crystal composition ("KN-400", available from Chisso K.K.) and injected into the gap between the substrates 2a and 2b to form a liquid crystal device.

As a result of multiplexing drive, the liquid crystal device exhibited substantially no rough appearance due to fixation of the liquid crystal alignment at the outside-pixel region 8a.

Next, a liquid crystal device according to a second embodiment of the present invention will be described.

Figure 3:
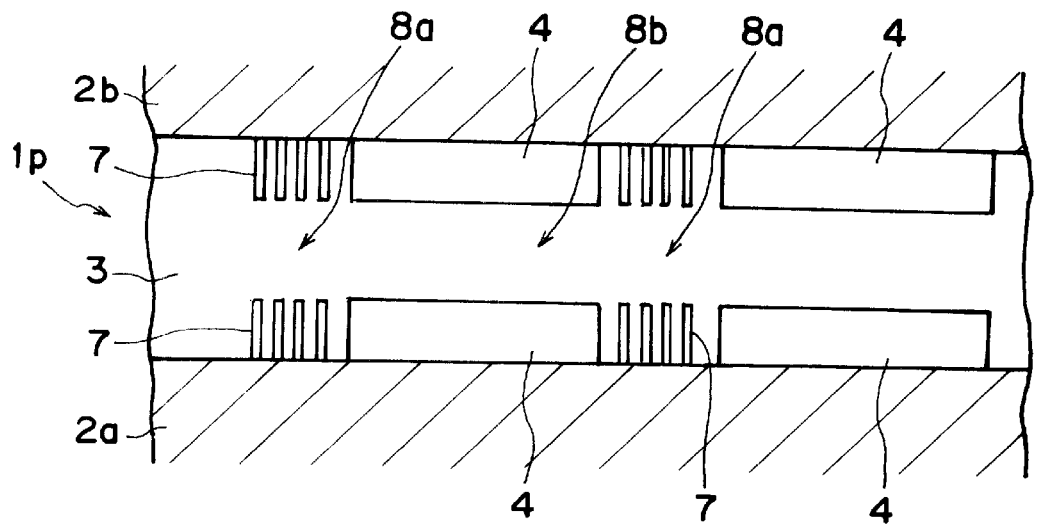
FIGS. 3, 4 and 7 are schematic sectional views of liquid crystal devices according to second, third and forth embodiments, respectively.

Referring to FIG. 3, a liquid crystal device 1p according to this embodiment includes color filters 4 and vertical structures 7 on both substrates 2a and 2b. Each color filter may have a thickness of, e.g., 0.75 $\mu m$ (about a half that of the color filter 4 in the first embodiment), and color filters 4 at opposing positions on both substrates may have an identical color.

The liquid crystal device 1p may be prepared by forming the color filter 4 and vertical structure 7 on each of the substrates 2a and 2b and thereafter performing formation of electrodes and alignment film, rubbing and application of the substrates similarly as in the first embodiment. Incidentally, it is possible to omit the color filters 4 from one substrate, e.g., 2b, while forming only the vertical structure 7 on the substrate 2b.

EXAMPLE 3

As a specific example, such a liquid crystal device 1p was prepared in the same manner as in Example 1 except for forming the color filters 4 and vertical structure 7 on both substrates.

The liquid crystal in the thus-prepared liquid crystal device 1p exhibited a uniform alignment at the pixel region 8b and a homeotropic alignment at the outside-pixel region 8a, and the liquid crystal device provided a high-quality display picture free from rough appearance. Further, the liquid crystal device 1p exhibited an improved stability of drive margin during a continuous drive and a suppressed cell gap change due to liquid crystal molecular movement.

Next, a third embodiment of the present invention will be described.

Figure 4:
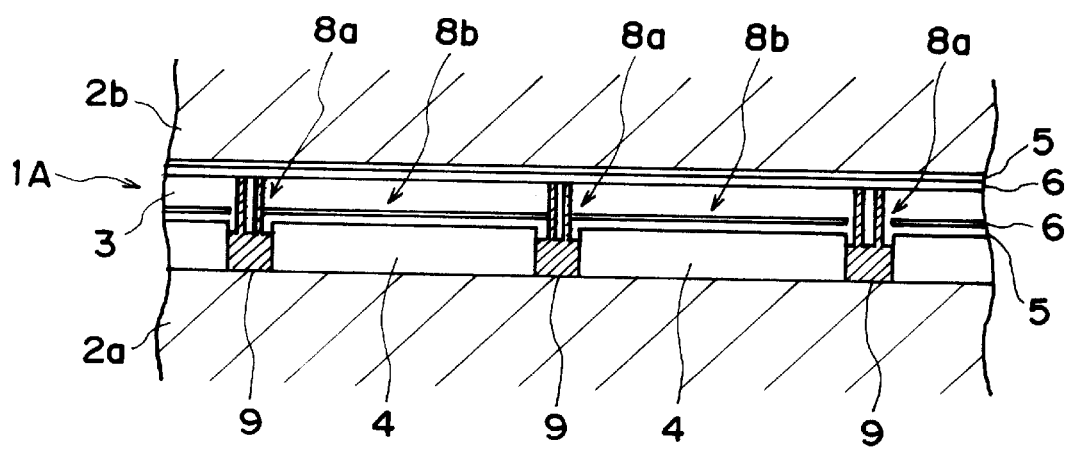

Referring to FIG. 4, which is a sectional view of a liquid crystal device 1A according to this embodiment, the liquid crystal device 1A includes a pair of substrates 2a and 2b for sandwiching a liquid crystal 3, color filter 4 formed on one substrate 2, patterned transparent electrodes 5 and uniaxial alignment films 6.

Figure 5:
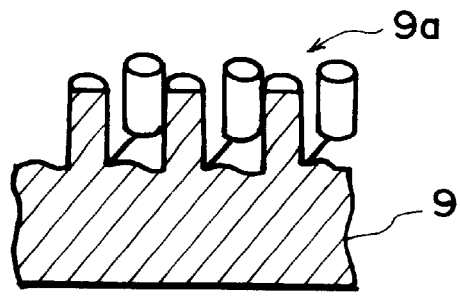
FIG. 5 is a schematic perspective view showing a partial section of an adhesive shade layer formed at an outside-pixel region of the liquid crystal device of FIG. 4.

In this embodiment, a shade layer (resin film) 9 composed of a colored resin having a shading (i.e., light-intercepting) property and an adhesiveness (e.g., a photosensitive and heat-bonding adhesive ("TP-AR", available from Tokyo Ohka Kogyo K.K.) is disposed at the outside-pixel region 8a. At the upper surface thereof, the shade layer 9 has minute vertical projections 9a as shown in FIG. 5, which function as a barrier against rubbing to diminish the rubbing effect so that the concave parts substantially receive no rubbing effect.

As a result of the provision of the shade layer 9 having projections 9a at the outside-pixel region 8a, the liquid crystal 3 at the outside-pixel region 8a is monostabilized in an asymmetrical alignment state or a homeotropic alignment state, so that the liquid crystal alignment change thereat is suppressed when the liquid crystal 3 at the neighboring pixel 8b is driven.

Figure 6:
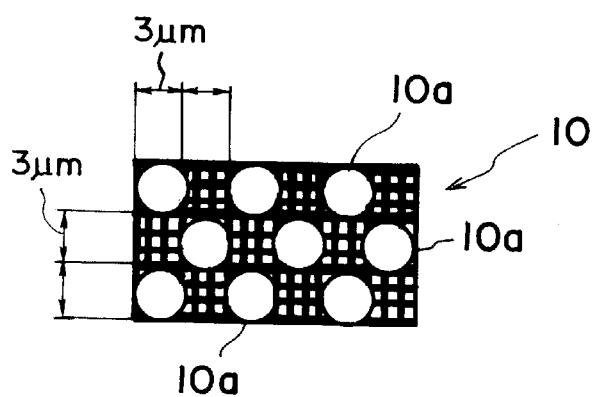
FIG. 6 is a planar illustration of a photomask pattern for providing a minute pattern of the adhesive shade layer of FIG. 5.

The shade layer 9 of a resin may be formed at a lower production cost and provide a device having an improved impact resistance, compared with a metal shade film. As in the first embodiment, the vertical projections 9a may preferably occupy 4–50% of a total planar area of the outside-pixel region 8a. Such projections may be produced by using a photomask having a light-transmissive pattern as shown in FIG. 6, which provides a projection real ratio of 39%.

A specific example of production of such a liquid crystal device 1A will now be described.

EXAMPLE 4

One glass substrate (1.1 mm-thick blue sheet glass) was subjected three color filter-forming cycles each including spin coating with a color filter-forming agent ("CFPR Series", available from Tokyo Ohka Kogyo K.K.), pre-baking at 100° C. for 2 min., exposure to ultra-violet rays at 200 mJ, showering development with an alkaline developer liquid for 40 sec. and post-baking at 250° C. for 5 min., to four three-colored color filters 4 each in a thickness of 1.5 $\mu$m.

Then, on the color filters 4, a composition formed by dispersing acrylic resin-coated carbon within a photosensitive acryl-type adhesive resin ("TP-AR", available from Tokyo Ohka Kogyo K.K.) was applied and pre-baked. Then, the applied layer was exposed through a photomask 10 having apertures 10a each in a diameter of 3 $\mu$m as shown in FIG. 6 applied on a backside of the glass substrate 2a, followed by development, to form a shade layer 9 having vertical projections of 0.6 $\mu$m and providing a final thickness up to the top thereof of 2.1 $\mu$m.

Then, transparent electrodes 5 were formed thereon, and a polyimide precursor ("LQ1800", available from Hitachi Kasei K.K.) was applied thereon, followed by baking at 270° C. for 10 min. to form a 200 Å-thick alignment film 6, which was then rubbed in one direction at an intensity for providing a pretilt angle of ca. 20 deg.

Another substrate 2b was treated in the same manner as above except for forming the steps of forming the color filters 4 and the shade layer 9. Then, the substrates 2a and 2b were applied to each other with an epoxy sealing adhesive and with spacer bead dispersed therebetween at a rubbing direction crossing angle of −8 deg., followed by curing of the sealing adhesive and bonding with the shade layer projections 9 at 160° C. for 30 min. under a pressure of 1 kg/cm². Then, the same liquid crystal composition as used in Example 1 was injected to the gap between the substrates 2a and 2b to prepare a liquid crystal device 1A.

The liquid crystal in the thus-prepared liquid crystal device 1A exhibited a uniform alignment providing a desired pretilt and a hybrid alignment including a homeotropic alignment and a homogeneous alignment on both substrates at the outside-pixel region 8a, and the liquid crystal device provided a high-quality display picture with an effective shading at the outside-pixel region 8a.

Figure 7:
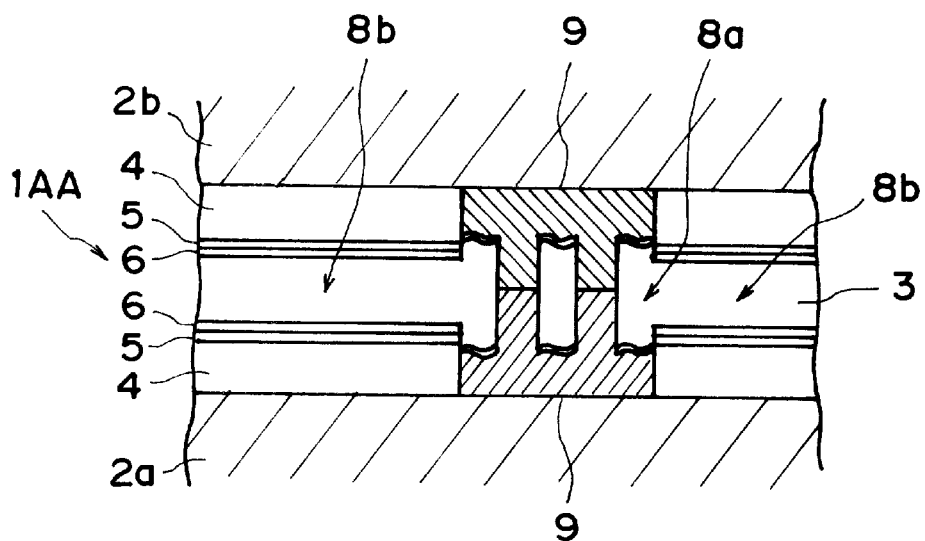

A liquid crystal device 1AA according to a fourth embodiment of the present invention is described with reference to FIG. 7. Referring to FIG. 7, the liquid crystal device 1AA includes color filters 4 and a shade layer 9 formed on both substrates 2a and 2b. Each color filter 4 may be formed in a similar manner as in the above third embodiment but in a thickness of, e.g., 0.75 $\mu$m (about a half that of the color filter 4 in the third embodiment), and color filters at opposing positions may have an identical color. It is however possible to omit the color filters on one substrate and form only the shade layer 9.

Further, the shade layers 9 on both substrates may be disposed at opposing positions so that they are bonded to each other at the outside-pixel region 8a. The shade layer 9 may have a projection height of 0.5 $\mu$m and a total thickness of 1.35 $\mu$m.

EXAMPLE 5

Such a liquid crystal device 1AA was prepared in the same manner as in Example 4 forming the color filters 4 and the shade layer 9 on both substrates.

The liquid crystal in the liquid crystal device 1AA assumed a uniform alignment at the pixel region 8b, and the liquid crystal device provided a high-quality picture display at a high quality. It was also possible to provide an improved impact resistance, an improved durability of drive margin with time and an effect of suppressing a cell gap change due to liquid crystal molecular movement.

According to the above-described first to fourth embodiments of the present invention, the liquid crystal alignment at the outside-pixel region is monostabilized by providing a projecting structure, preferably a vertical structure, at the outside-pixel region to remove a rough appearance of display and provide an improved display quality. Further, in the case of establishing a homeotropic alignment at the outside-pixel region, it is possible to provide an improved durability of drive margin and suppress a cell gap change due to liquid crystal molecular movement, thus further contributing to improvements in quality and reliability of a liquid crystal device.

Further, in case where the projecting structure is provided by a portion of a shade layer at the outside-pixel region, an improved contrast is provided in order to suppression of a rough appearance owing to monostabilization of the alignment. Further, by composing the shade layer with an adhesive resin, it is possible to provide a reliable liquid crystal device at a low production cost.

Figure 8:
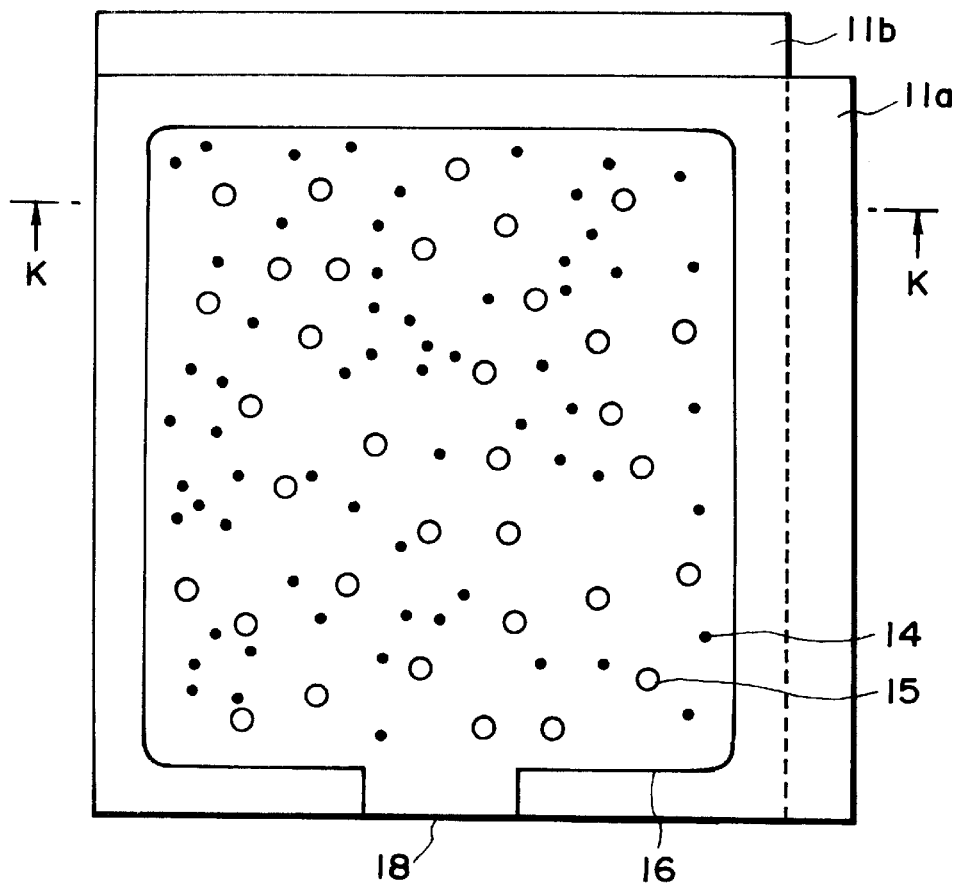
FIG. 8 is a schematic plan view of a liquid crystal device according to a fifth embodiment of the invention.
Figure 9:
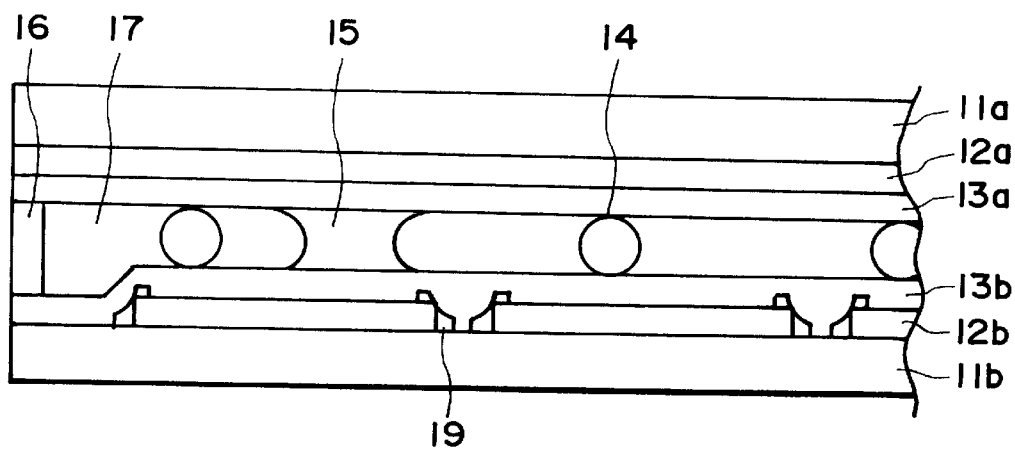
FIG. 9 is a view showing a sectional view taken along a K—K line in FIG. 8.
Figure 10:
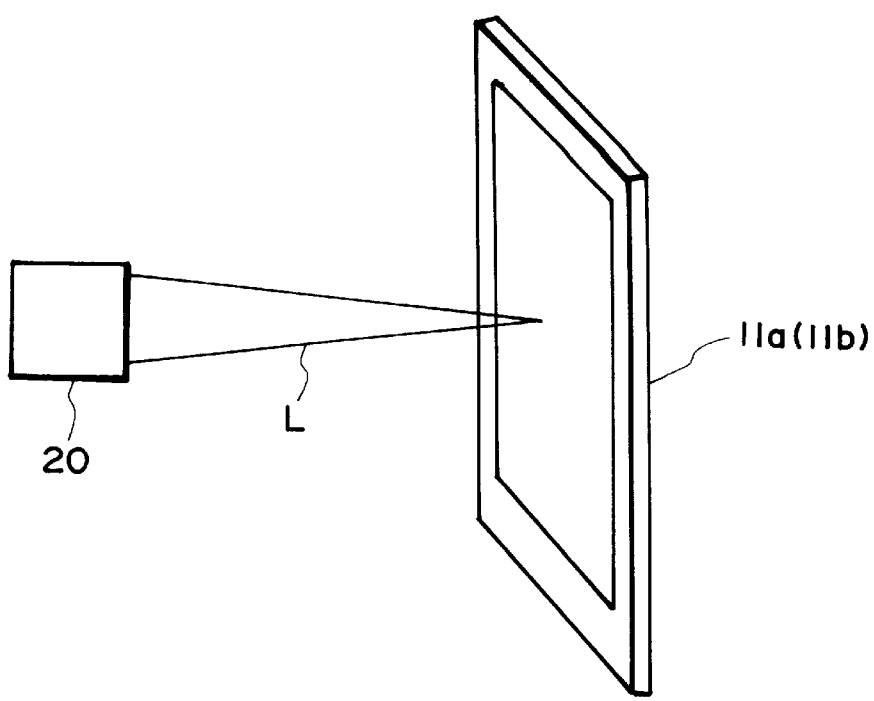
FIG. 10 illustrates a manner of ultraviolet irradiation of a pixel-spacing region on a substrate for the liquid crystal device of FIG. 8.

FIG. 8 is a schematic plan view of a liquid crystal device according to a fifth embodiment of the present invention, and FIG. 9 is a sectional view taken along a line K—K in FIG. 8.

Referring to these figures, the liquid crystal device includes a pair of oppositely disposed substrates 11a and 11b having thereon ca. 400–2000 Å-thick stripe-shaped ITO transparent electrodes 12a and 12b, respectively, and further thereon ca. 10 Å to 1000 Å-thick alignment films 13a and 13b, respectively, of an organic polymer, such as polyimide, polyamide and polyvinylalcohol (PVA) resin. Such alignment films 13a and 13b may respectively be formed, e.g., by spin coating of a 1%-NMP (N-methylpyrrolidone) solution of polyamide acid (e.g., "LQ1802", available from Hitachi Kasei K.K.), followed by baking at 270° C. for 60 min.

Figure 11:
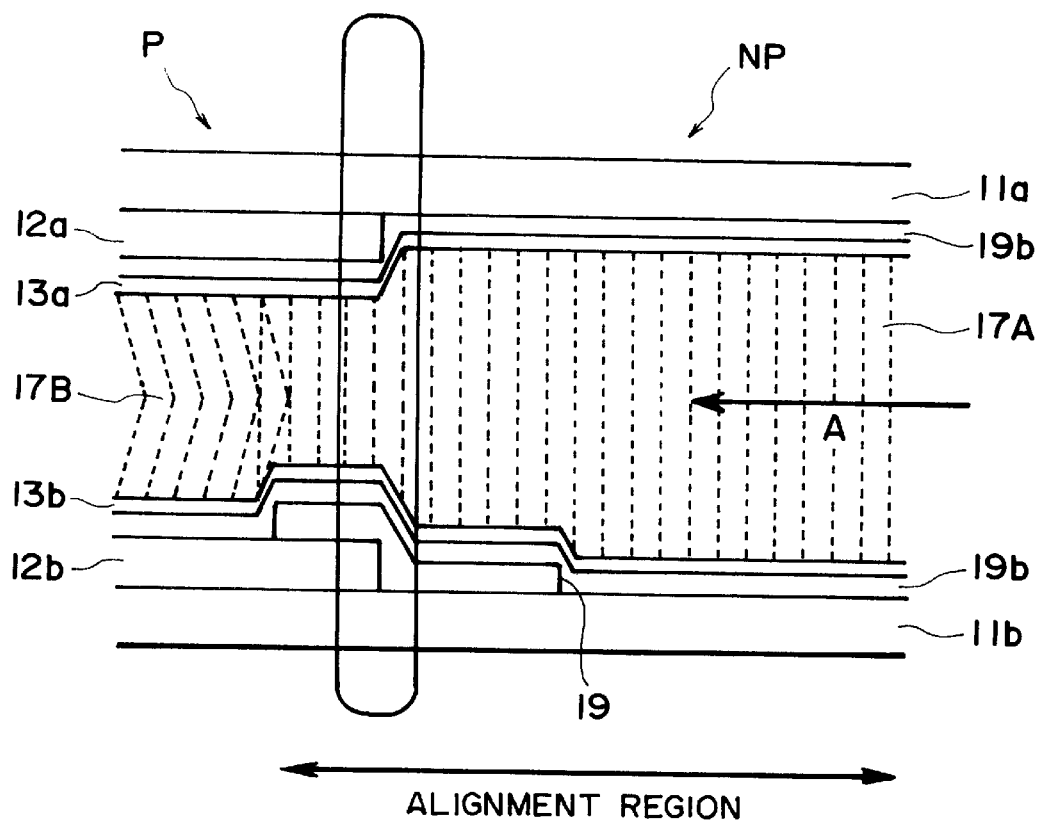
FIG. 11 is a schematic sectional view for illustrating shapes and alignment characteristics of a pixel region and a pixel-spacing region in the liquid crystal device of FIG. 8.

In a preferred embodiment, as shown in FIG. 11, it is possible to dispose insulating films 19a and 19b of, e.g., ca. 100 Å to 2000 Å-thick SiO$_2$ film between the transparent electrodes 12a, 12b and the alignment films 13a, 13b, respectively. Such an SiO$_2$ film may be formed by applying a precursor solution (e.g., "PZT-6", available from Shokubai Kasei K.K.) according to a printing method using an extender plate, followed by preliminary drying at 80° C. for 3 min. and baking at 300° C.

The gap between the substrates 11a and 11b (liquid crystal cell gap) may be generally retained at constant by spacer beads 14 of, e.g., silica beads having a diameter of 0.1 μm–10 μm dispersed between the substrates, and further particulate adhesive members 15 are dispersively disposed in the liquid crystal 17. The particulate members 15 may preferably be in the form of resin particles of, e.g., epoxy resin, for preventing a change in gap between the substrates liable to be caused by application of an external stress.

The outer periphery of the substrates 11a and 11b may be sealed, e.g., with an epoxy-type adhesive (sealing member) 16 while leaving an injection port 18 for injecting the liquid crystal 17 therethrough. After the liquid crystal injection, the injection port 18 may be sealed with, e.g., an epoxy resin. The transparent electrodes 12b (and also 12a while not shown) may be supplemented with an auxiliary metal electrode of, e.g., Al, formed along one or both sides (as shown) of each transparent electrode 12 by coating with a uniform metal film, e.g., by sputtering, and then by patterning by photolithography using a photoresist.

In such a liquid crystal device, for example, a pixel may be formed in a size of 200 μm×200 μm with a pixel-spacing of 10 μm and an auxiliary metal electrode width of 10 μm. During formation of such a liquid crystal device according to this embodiment, the substrates 11a and 11b provided with up to the alignment films 13a and 13b may be subjected to rubbing as a uniaxial aligning treatment so that their rubbed directions are nearly parallel to each other when the substrates 11a and 11b are assembled to each other. The rubbing may for example be performed by rotating a rubbing roller comprising a 5 cm-dia., core roller about which a rubbing cloth comprising a yarn of nylon 66 having yarn length of 4 mm is wound.

Then, each of the substrates 11a and 11b having thereon the alignment films 13a and 13b subjected to rubbing may be exposed to a scanning ultraviolet (UV) light beam L having a narrowed diameter of 10 μm from a UV irradiation apparatus 20 so that the center of the UV beam L passes along a center of a pixel-spacing concerned. By scanning exposure to the UV light L, the polymer characteristic of the alignment films 13a and 13b on the substrates 11a and 11b may be lost at the outside-pixel region thereof including the pixel-spacing region and the region of auxiliary metal electrodes to result in a film portion exhibiting a homeotropic alignment characteristic. In this embodiment, the UV light L at a power of 20 mW/cm² may be scanned at a rate of 8 cm/min.

After treating the alignment films 13a and 13b in the above-described manner, the substrates 11a and 11b may be subjected to dispersion of spacer beads 14 and particulate adhesive members 18 for retaining a cell gap, bonding of the substrates 11a and 11b, and sealing of the periphery of the substrates 11a an 11b with the sealing agent 16, then injection of the liquid crystal through the injection port 18 and sealing of the injection port 18 to provide a liquid crystal device.

In this embodiment, a pyrimidine-based mixture liquid crystal A (ferroelectric liquid crystal) having the following phase transition series and some other properties may be used. (Pyrimidine-based mixture liquid crystal A)

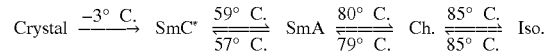

Tilt angle Ⓗ=4 deg. (at 30° C.)

Layer inclination angle δ=11 deg. (at 30° C.)

Apparent tilt angle θa=11 deg. (at 30° C.)

As a specific example, a liquid crystal device for evaluation of drive performance and alignment state was prepared in the above-described manner under specifically disclosed conditions and by using the above-mentioned pyrimidine-based mixture liquid crystal and forming the alignment films 3a and 3b so as to provide a pretilt angle of 7 deg. at the pixel region. For comparison, a comparative liquid crystal device was prepared in the same manner except for omitting the treatment of the alignment films 3a and 3b by exposure to UV light L.

As a result, both liquid crystal devices showed an identical threshold value for switching between stable states at the pixel region but, with respect to an electric field intensity causing memory characteristic disorder, the example liquid crystal device subjected to the UV exposure exhibited a drive margin of electric field intensity width allowing a display which was broader by 10–20% than the comparative liquid crystal device not subjected to the UV exposure.

Figure 25:
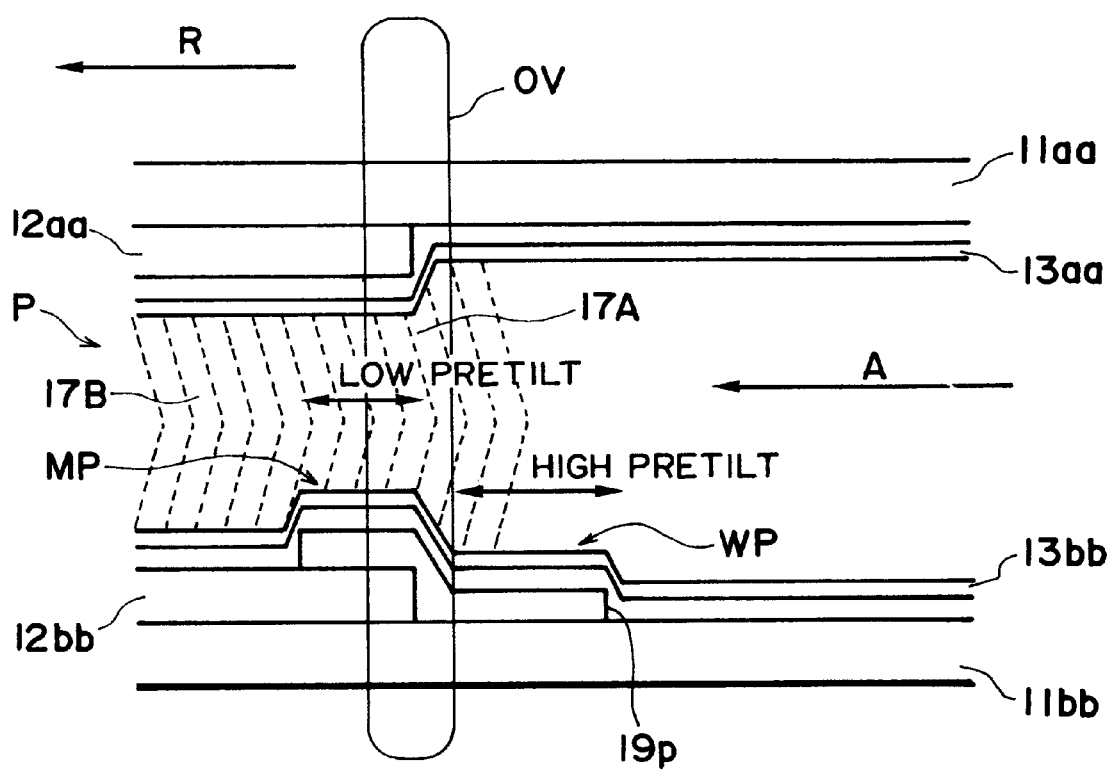
FIG. 25 is a schematic sectional view for illustrating discontinuity of shape and alignment characteristic at a boundary between a pixel region and a pixel-spacing region in a known liquid crystal device.
Figure 26:
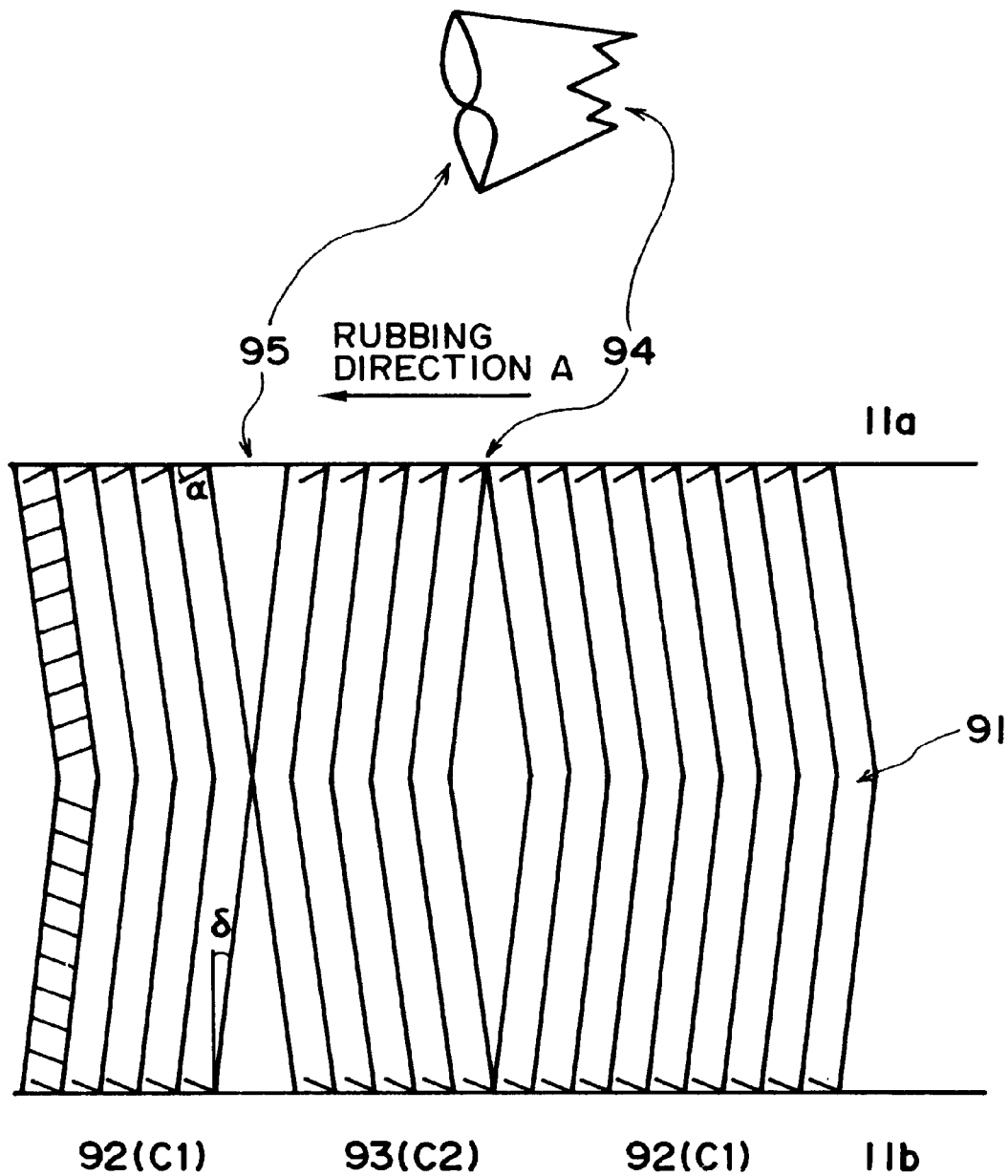
FIG. 26 illustrates a smectic layer alignment model of a ferroelectric liquid crystal in a known liquid crystal device.
Figure 27A:
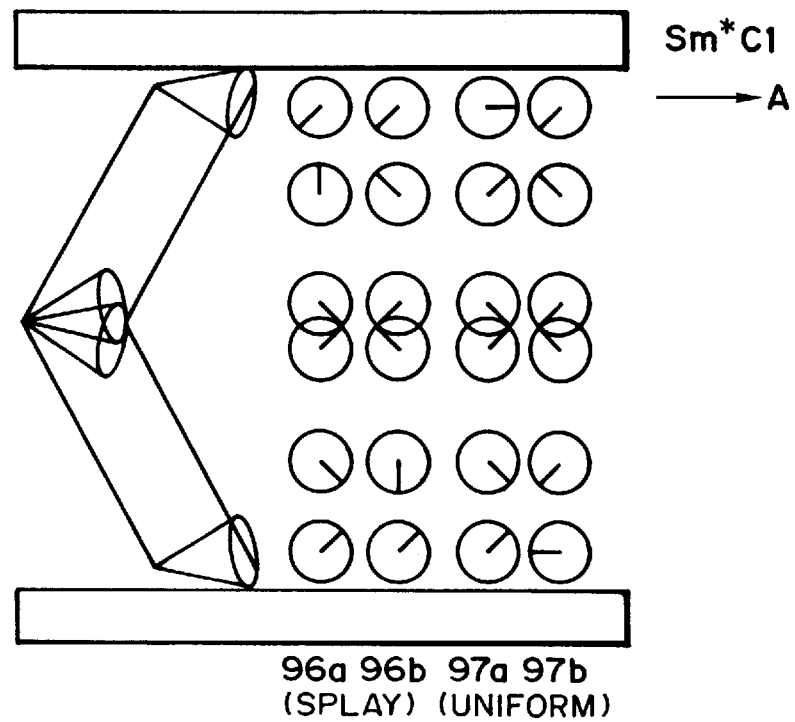
FIGS. 27A and 27B are schematic views for illustrating variations of director positions in C1 and C2 alignments, respectively, of the ferroelectric liquid crystal corresponding to FIG. 26.
Figure 27B:
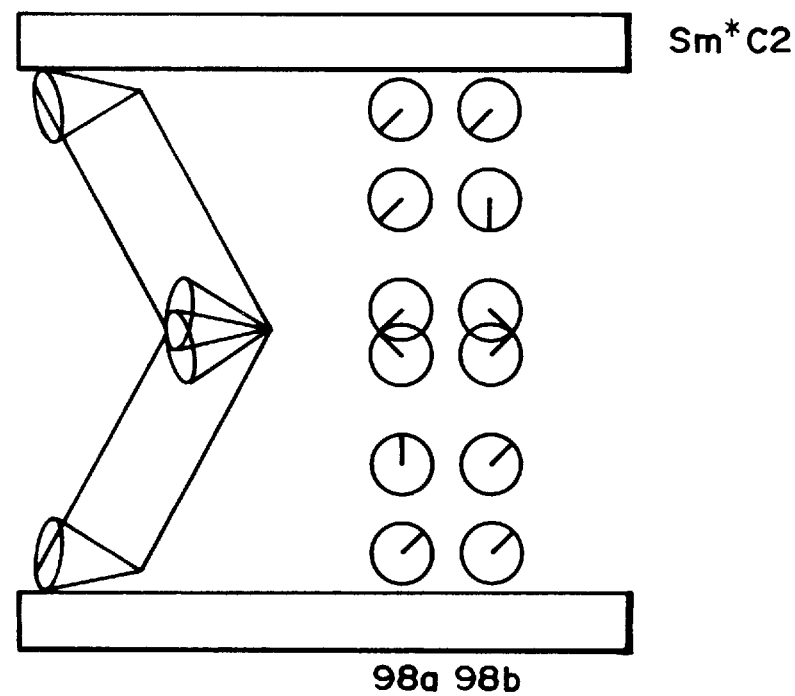
Figure 28:
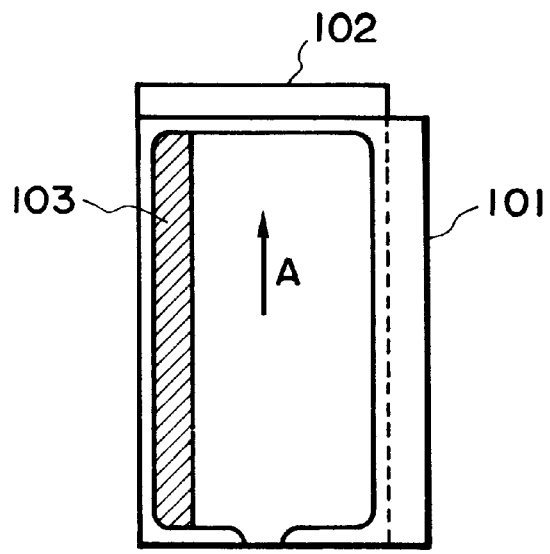
FIG. 28 is an illustration of a liquid crystal molecular movement.
Figure 29:
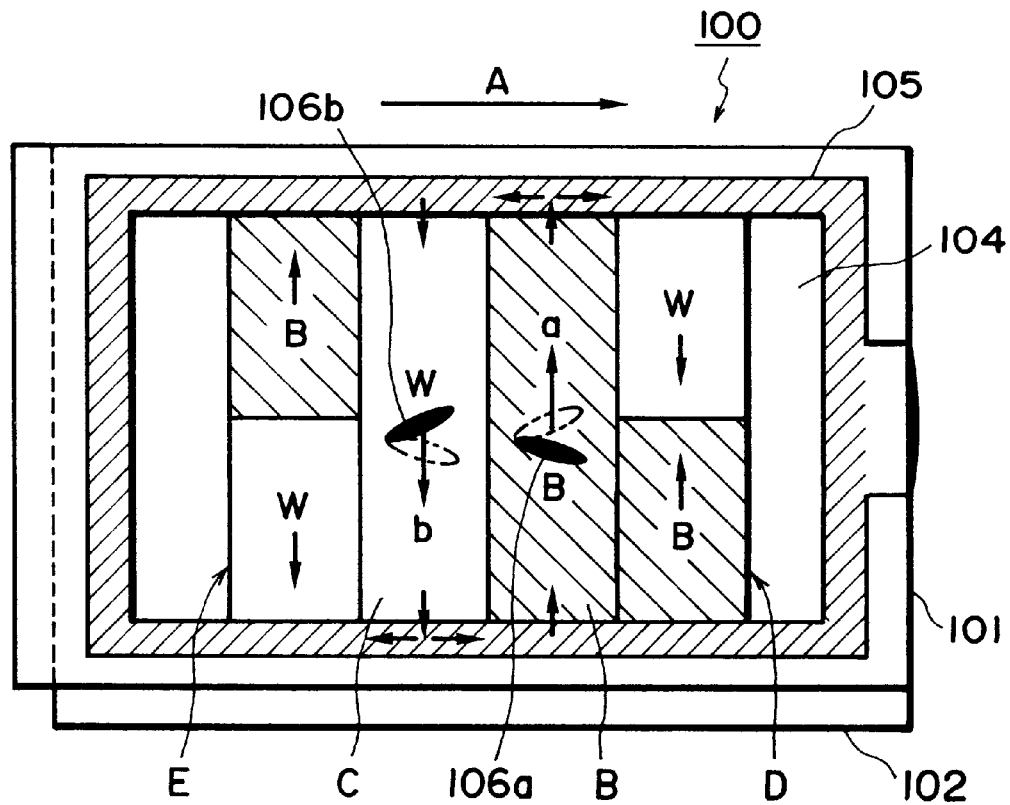
FIG. 29 is a planar illustration of various liquid crystal molecular movements in a known liquid crystal device.

Regarding the switching characteristic, the comparative liquid crystal device not subjected to the UV exposure caused a memory characteristic disorder from a region enclosed with an oval OV where the rubbing cloth moving in the rubbing direction A collided first with the stepwise elevation (FIG. 25), whereas the example liquid crystal device subjected to the UV exposure did not cause such a memory characteristic disorder at a similar boundary region surround by an oval OV between the pixel-spacing region NP and the pixel region P (FIG. 11) but caused a memory characteristic disorder within the pixel region P at a higher electric field intensity.

As described above, by irradiating the pixel-spacing region NP with UV light L to provide a homeotropic alignment characteristic, it becomes possible to prevent the liquid crystal 17A at the pixel-spacing region from being driven in response to an electric field applied between the transparent electrodes 12a and 12b at the pixel, thus suppressing the propagation or growth of alignment defect and memory characteristic disorder into the pixel region P.

In the above, the effect of the present invention has been described with reference to a liquid crystal device using a thin layer of ferroelectric liquid crystal, but the effect of display quality improvement according to the present invention may also be generally applicable to liquid crystal devices comprising a plurality of pixels separated by a pixel-spacing region, including those using a larger cell gap for a liquid crystal other than a ferroelectric liquid crystal and those driven according to the active matrix-type drive scheme.

The present invention is advantageous in that it allows a liquid crystal device production without requiring a remarkable change of conventional liquid crystal device production process and while maintaining a conventional level of production yield to provide improved drive characteristics and durability of liquid crystal display devices.

Next, a description will be made on a sixth embodiment of the present invention wherein a homeotropic or homogeneous aligning agent is locally applied onto a substrate to form a homeotropic or homogeneous alignment film at the outside-pixel region.

Figure 12:
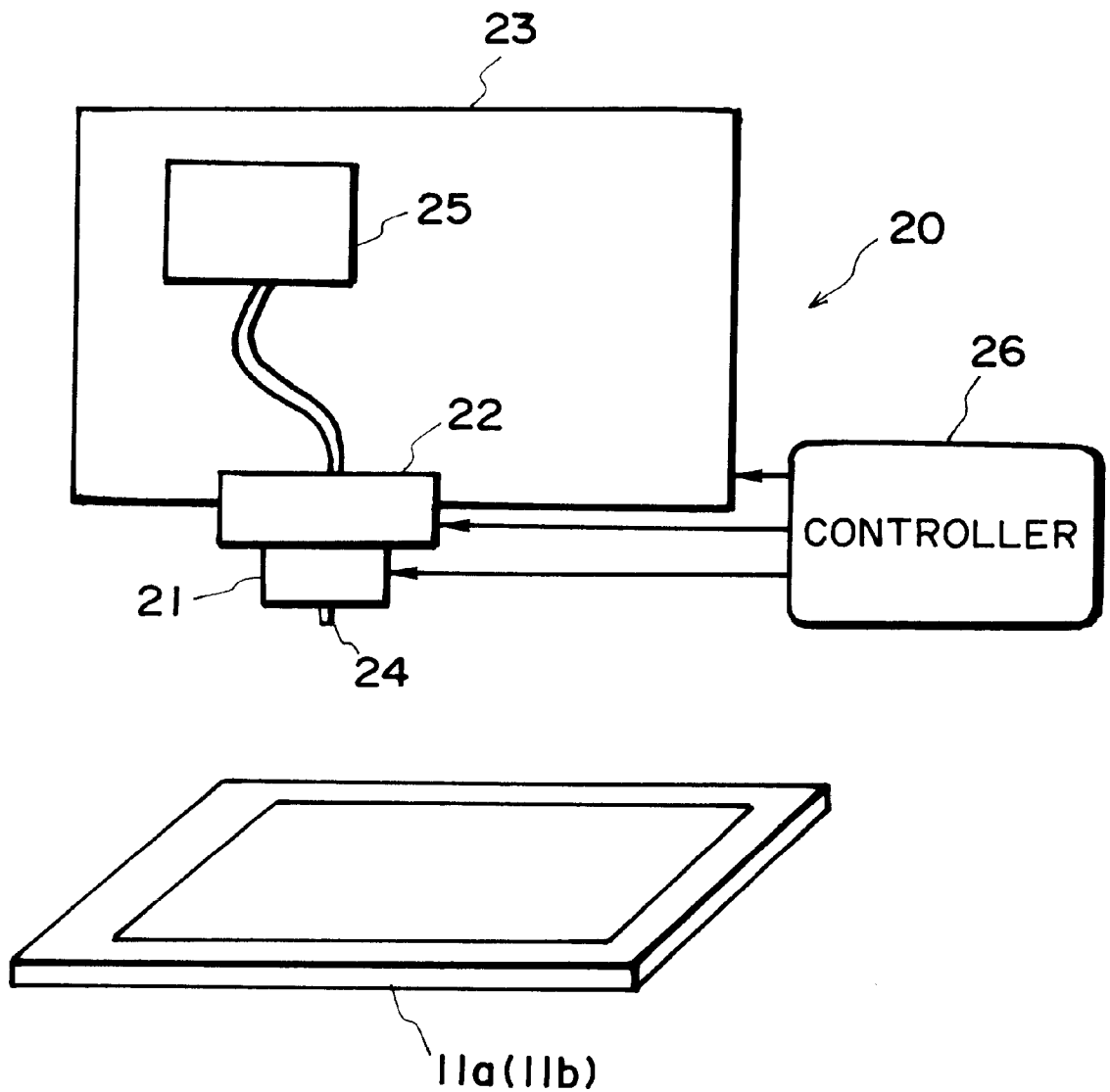
FIGS. 12–14 illustrate manners of ejecting an aligning agent onto a substrate for a liquid crystal device according to sixth to eighth embodiments, respectively, of the invention.

FIG. 12 is an illustration of such a local application system according to the sixth embodiment of the present invention including aligning agent ejector apparatus for ejecting a homeotropic aligning agent (i.e., an aligning agent for forming a homeotropic alignment film on a substrate). The system includes an aligning agent ejector apparatus 20 which in turn includes an ultrasonic vibrator element 21 for ejecting a solution of a homeotropic aligning agent onto an outside-pixel region including a pixel-spacing region and a region of auxiliary metal electrodes. An example of such an application liquid may include a 1 wt. % solution in NMP of polyamide acid ("LQ1802", available from Hitachi Kasei K.K.) as a homeotropic aligning agent.

In the system, a substrate 11a (or 11b) already provided thereon with up to a surface layer of homogeneous alignment film (e.g., one providing a pretilt angle of 16 deg.) is fixed on a stainless steel-mode horizontal stage (not shown) and subjected to a local application by ejection of such a homeotropic aligning agent solution through a nozzle 24 provided with the ultrasonic vibrator element 21, whereby a homeotropic alignment film is formed locally at the outside-pixel region of the substrate 11a (or 11b).

The ultrasonic vibrator element 21 is fixed to a minute drive mechanism 22 for moving the vibrator 21 horizontally, vertically or rotationally to move the vibrator 21 along a prescribed path, and the minute drive mechanism 22 is held by an X-Y stage 23 which moves horizontally and vertically relative to the substrate 11a (or 11b) and constitutes an ejector moving mechanism together with the minute drive mechanism 22. The ejector nozzle 24 actuated by the vibrator 21 is supplied with the application liquid held within a solution reservoir 25.

In order to effect the alignment of the nozzle 24 with the substrate 11a (or 11b), the substrate 11a (or 11b) is provided with alignment marks (not shown) formed by vapor deposition of a metal such as aluminum or chromium, and the minute drive mechanism 22 is equipped with a laser (not shown) for emitting laser light toward the alignment marks and detection elements at three positions for detecting reflected light from the alignment marks.

The laser is controlled by a control computer 26 so as to emit the laser light toward the alignment marks prior to the solution ejection from the nozzle 24, and the detection elements, when detecting the reflected light from the alignment marks, supply detection signals to the controller 26. Based on the detection signals from the detection elements, the controller 26 recognizes the horizontal, vertical and rotational positions of the substrate 11a (or 11b) and corrects the position of the minute drive mechanism 22 so as to move the nozzle 24 horizontally along the pixel-spacing region.

After position determination of the nozzle 24 relative to the substrate 11a (or 11b), the controller 26 controls the nozzle 24 to initiate the solution ejection, the minute drive mechanism 22 so as to move the nozzle 24 accurate along the pixel-spacing region and the frequency of the ultrasonic vibrator 21 to control the ejection speed of the aligning agent solution out of the nozzle.

According to the above-described mechanism, it is possible to periodically eject the solution onto the substrate 11a (or 11b) and control the ejection speed out of the nozzle, thus controlling the nozzle scanning speed and the solution ejection period, whereby the aligning agent solution can be applied to the pixel-spacing region disposed in regular intervals on the substrate 11a (or 11b). After the application, the aligning agent may be subjected to baking to form a patterned homeotropic alignment film.

A specific liquid crystal device was produced by using the substrates 11a and 11b treated in the above-described manner, and the alignment state of the liquid crystal in the device was observed through a polarizing microscope equipped with cross nicol polarizers. As a result, the liquid crystal in the device exhibited a uniform alignment state providing two stable states giving a dark and a bright state at the pixel region, but always provided a dark state at the outside-pixel region when the cross nicol polarizers were rotated relative to the device, thus exhibiting a homeotropic alignment state.

In the homeotropic alignment state, the direction of the spontaneous polarization Ps of the liquid crystal does not respond to an electric field applied between a pair of opposing electrodes on the substrates sandwiching the liquid crystal, so that the liquid crystal at the outside-pixel region does not affect the drive voltage margin at the pixel region.

When the above-prepared liquid crystal device was evaluated by driving, the memory characteristic disorder was solely caused by the drive conditions at the pixel region compared with the device including the liquid crystal in the uniform alignment state also at the outside-pixel region, and not governed by the discontinuity of the alignment state and the electric field at the outside-pixel region, thus exhibiting a drive voltage margin similar to that attained in the fifth embodiment described above.

The liquid crystal placed in the homeotropic alignment state at the outside-pixel region in this embodiment provides a dark state when combined with cross nicol polarizers set to allow a dark-bright switching at a pixel region of uniform alignment state, and the dark state at the outside-pixel region functions like a black matrix shade layer conventionally disposed below the alignment film.

Next, a description will be made on a seventh embodiment wherein, instead of ejecting an aligning agent solution out of a nozzle with a positional control as in the sixth embodiment, an aligning agent solution is ejected, charged and deflected by an electric field, thus being controlled to be applied to the outside-pixel region on a substrate.

Figure 13:
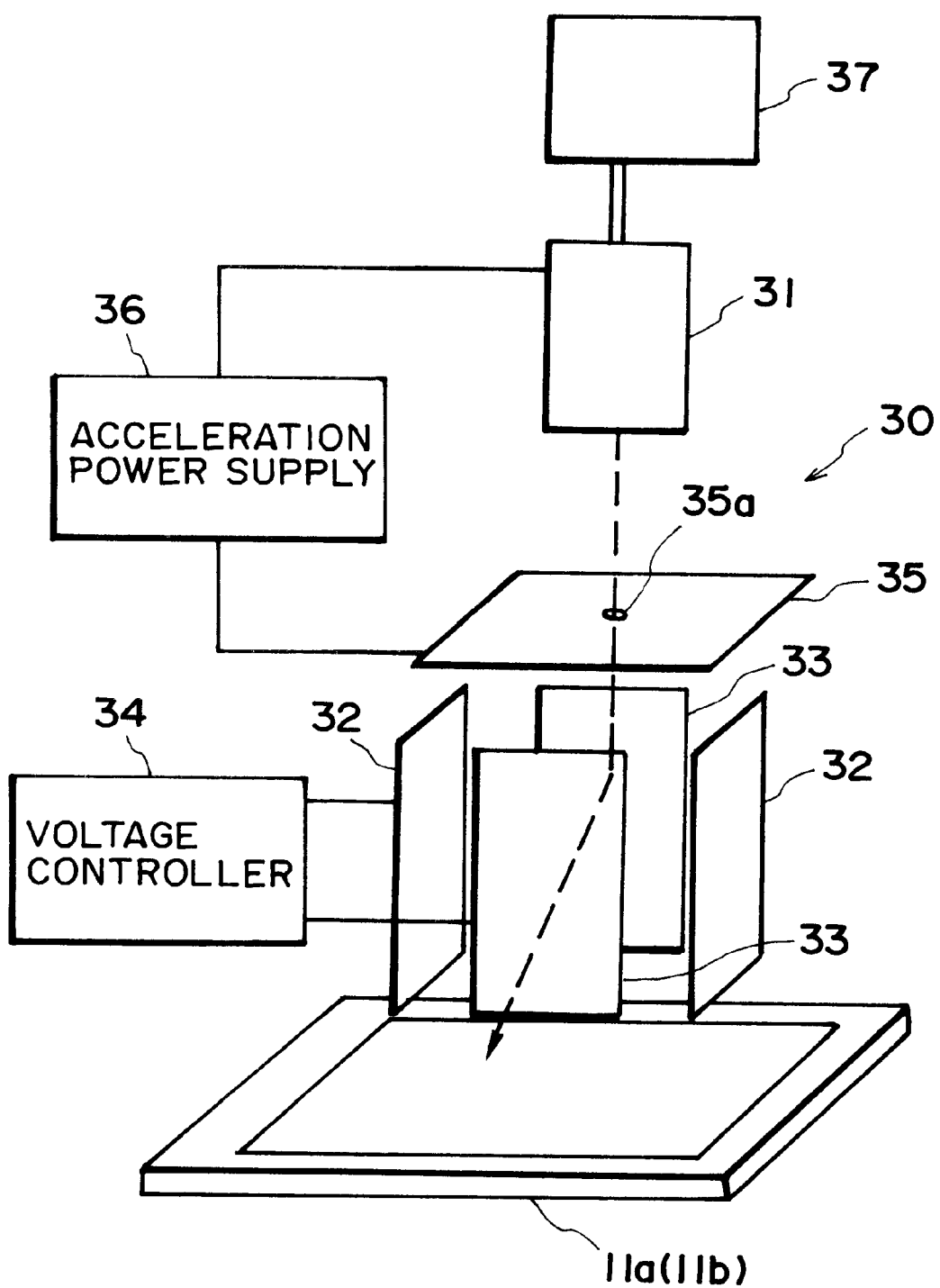

FIG. 13 is an illustration of such a local application system according to the seventh embodiment including an aligning agent application apparatus or applying, e.g., a homeotropic alignment film on a substrate. The system includes an aligning agent application apparatus 30 which in turn includes a drive unit 31 including an ejector including an ultrasonic vibrator element and a nozzle similar to those used in the previous embodiment for ejecting an aligning agent solution droplet toward a substrate 11a (or 11b) fixed on a stainless steel-made stage, and a charger for charging the ejected outlet. The aligning agent solution is supplied from a reservoir 37.

The ejected and charged solution droplet is accelerated under an electric field formed between the drive unit 31 and an accelerator electrode 35 by means of an acceleration power supply 36 to pass through a slit 35a formed in the accelerator electrode 35. The charged solution droplet having passed through the slit 35a is deflected under the action of a deflecting electric field exerted by two pairs of oppositely disposed deflecting electrodes 32 and 33. The voltages applied to the two pairs of electrodes 32 and 33 are respectively controlled by a voltage control unit 34 in synchronism with the solution ejection cycle, whereby the solution droplets are applied locally at the outside-pixel region on the substrate 11a (11b).

In addition to the deflection control, the ejector including the ultrasonic vibrator and the ejection nozzle may be further provided with a minute drive mechanism and laser detection means so as to allow a horizontal, vertical and rotational movement of the nozzle relative to the substrate 11a (11b) similarly as in the previous embodiment.

Next, a description will be made on an eighth embodiment wherein a plurality of nozzles integrated at a high density are used to eject an aligning agent solution by expansion or bubble generation pressure within the nozzles to apply the aligning agent solution locally at the outside-pixel region on a substrate.

Figure 14:
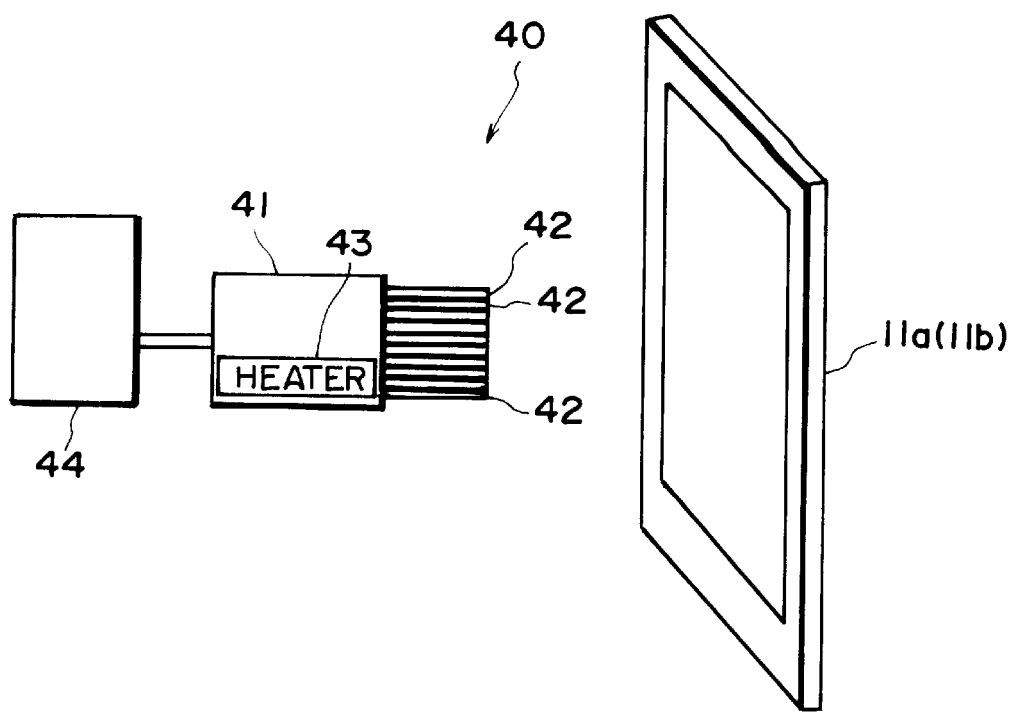

FIG. 14 is an illustration of such a local application system according to the eighth embodiment. The system includes an aligning agent application apparatus 40, which in turn includes a solution ejector unit 41 equipped with a multiplicity of nozzles 42 integrated at a high density and a heater 43 for heating the solution in each nozzle to cause expansion or bubble formation for providing an ejection energy to the solution supplied from a reservoir 44. The nozzles 42 are disposed opposite to and movably relative to the substrate 11a (11b) to apply the ejected solution locally at the outside-pixel region on the substrate. The solution ejector unit 41 is provided with the mechanism for position detection and alignment of the nozzles relative to the substrate.

After positional alignment of the nozzles 42 relative to the substrate 11a (11b), an aligning agent solution may be ejected locally onto the substrate. By using a controller computer (26 as shown in FIG. 12), the solution ejection may be effected by selecting a prescribed nozzle in the nozzles and heating the nozzle selectively, in synchronism with the scanning speed of the solution ejector unit 41 and the pitch of the outside-pixel region on the substrate 11a (11b).

According to this embodiment, a multiplicity of nozzles disposed at a high intensity can be driven while maintaining a substantially identical operation duty for each nozzle, so that the time for applying the aligning agent solution on an identical size of substrate can be shortened than in the sixth embodiment.

In the above embodiments, the aligning agent solution is applied locally at the outside-pixel region by ejection through a nozzle. However, it is also possible to provide a locally different aligning treatment by a sequence of applying a patterned resist at the outside-pixel region on an alignment film before rubbing, and then rubbing the alignment film including the pixel region on the substrate (Ninth embodiment).

By peeling the resist film thereafter, the exposed part may provide a homeotropic alignment film not subjected to rubbing, while leaving a rubbed part providing a uniform alignment characteristic. This embodiment is advantageous for providing a high-resolution display device.

In the above-described 6th–8th embodiments, it has been described to use a homeotropic aligning agent but it is also possible to use a homogeneous aligning agent (e.g., "LP-64", available from Toray K.K.).

Specific liquid crystal devices prepared according to 5th to 9th embodiments were found to exhibit an effect of suppressing a liquid crystal layer thickness change due to liquid crystal layer thickness change due to liquid crystal molecular movement during a continuous drive compared with conventional liquid crystal devices having an outside-pixel region subjected to homogeneous aligning treatment identical to that of the pixel region.

The presence of a homogeneous alignment film at the outside-pixel region providing a pretilt angle lower by at least 10 deg., preferably at least 15 deg., than that in the pixel region has been also formed effective to suppress the liquid crystal molecular movement, presumably because the outside-pixel region in a lower pretilt homogeneous alignment state functions like a wall between pixels receiving a liquid crystal moving torque.

In case where a homeotropic alignment state is provided at the outside-pixel region, liquid crystal molecules in the homeotropic alignment state is much more mobile than those in the uniform alignment state, so that a moving torque caused in the pixel region may be alleviated by the homeotropic alignment region surrounding the pixels. As a result, a region of a locally concentrated moving torque may not be formed over the entire device area, so that a local cell gap change may be obviated. In view of the controllability of the alignment characteristic and transmissions, a homeotropic alignment state may preferably be formed at the outside-pixel region than a homogeneous alignment state.

As described above, according to the fifth to ninth embodiments of the present invention, the outside-pixel region on a substrate is subjected to a local homeotropic or homogeneous aligning treatment, so that the liquid crystal at the outside-pixel region is not driven (i.e., does not cause appreciable switching or optical state change when observed through a polarizing microscope of a magnifications of 50) under the drive conditions for the pixel region, whereby the propagation of alignment defect and memory characteristic disorder into the pixel region can be suppressed. As a result, it becomes possible to solve the difficulty in alignment characteristic and drive characteristic due to discontinuity of alignment and electrical condition at the outside-pixel region.

Figure 15:
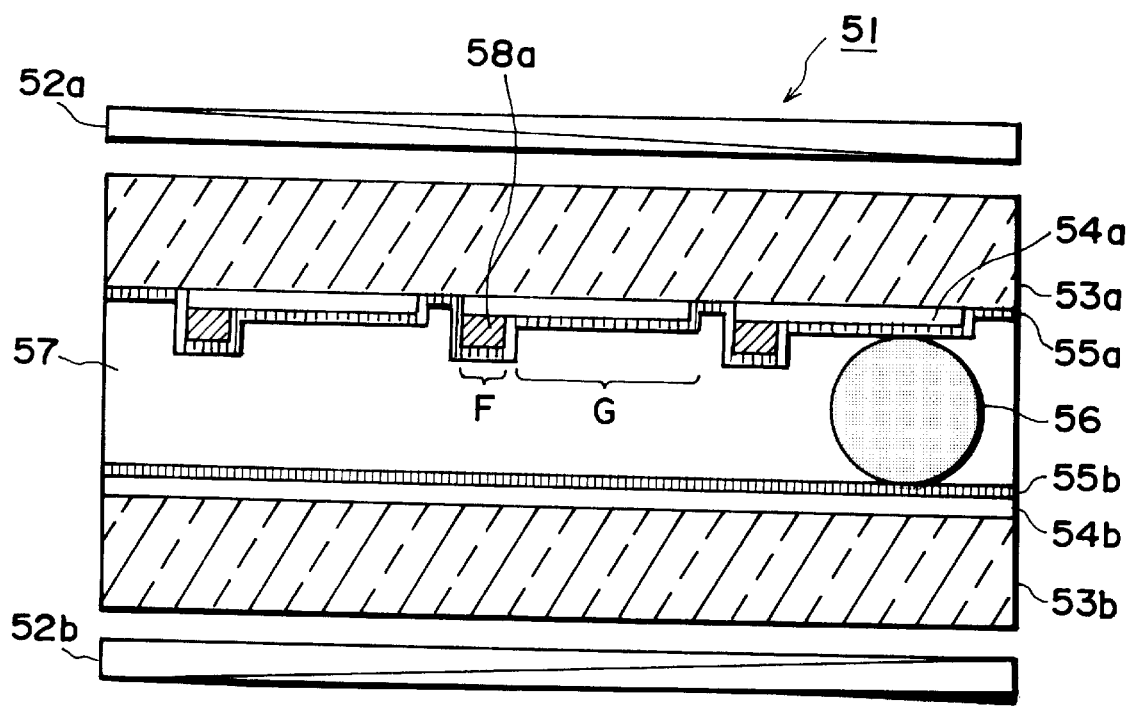
FIG. 15 is a schematic sectional view of a liquid crystal device according to a tenth embodiment of the invention.

FIG. 15 is a schematic sectional view of a liquid crystal device according to a tenth embodiment of the present invention. Referring to FIG. 15, a liquid crystal device 51 includes a cell structure disposed between a pair of polarizers 52a and 52b. The cell structure includes a pair of oppositely disposed glass substrates 53a and 53b, on which are further disposed stripe-shaped transparent electrodes 55a and 55b subjected to rubbing, respectively.

Between the alignment films 55a and 55b, spherical spacer beads 56 having a uniform diameter are dispersed so as to retain a prescribed cell gap (e.g., 1.5 μm) between the substrates 53a and 53b, which are bonded to each other and between which a ferroelectric liquid crystal 57 having bistability with respect to an electric field is disposed.

Figure 16:
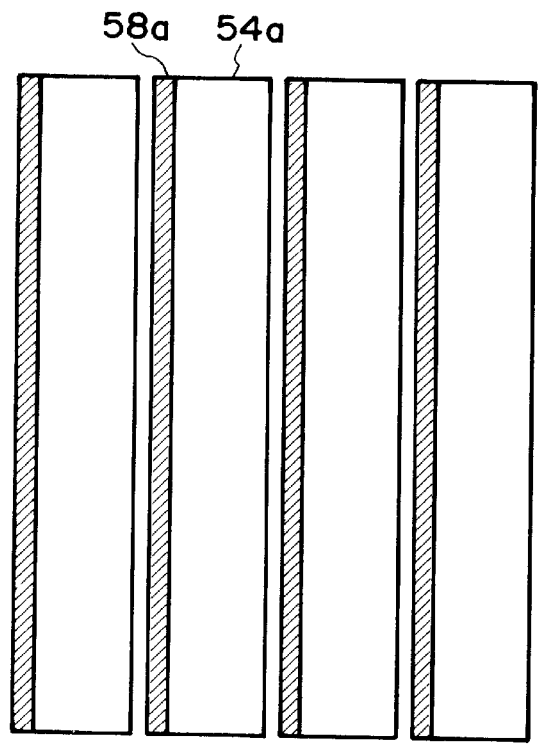
FIG. 16 is a plan view showing an electrode pattern on a substrate for the liquid crystal device of FIG. 15.
Figure 17:
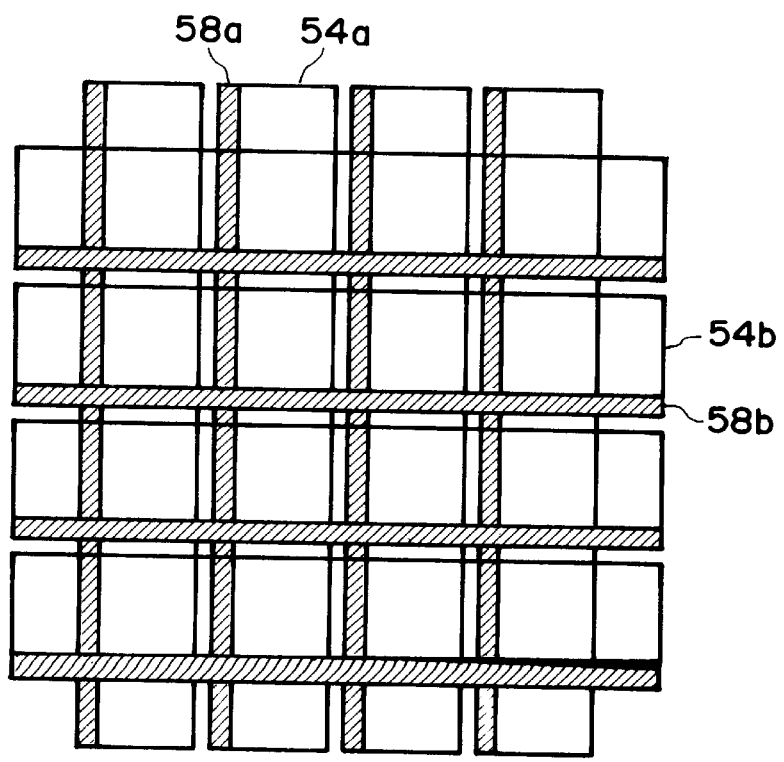
FIG. 17 is a plan view for illustrating a simple matrix electrode pattern including temperature electrodes and metal electrodes formed by combining a pair of substrates for the liquid crystal device of FIG. 15.

As shown in FIGS. 15–17, along one side each of the stripe-shaped transparent electrodes 53a and 53b on the substrates 53a and 53b, a low-resistivity metal electrode 58a or 58b of Al, etc., for providing a lower conductor resistance is disposed in electrical communication with the transparent electrodes 54a or 54b associated therewith, and the transparent electrodes 54a and 54b supplemented with the metal electrodes 58a and 58b disposed to intersect each other and form an electrode matrix as shown in FIG. 17, so as to form a pixel at each intersection. The surfaces of the metal electrodes 58a and 58b are provided with unevennesses of ca. 100–1000 Å by appropriately controlling the formation conditions for the films of the metal electrodes, e.g., by sputtering onto a substrate held at an elevated temperature of, e.g., 100–300° C. The alignment films 55a and 55b are respectively subjected to a uniaxial rubbing treatment and disposed so that their rubbing directions are substantially identical to each other.

In this embodiment, the portions of the alignment films 55a and 55b at the pixel regions (i.e., above the portions of the transparent electrodes 54a and 54b not provided with the metal electrodes 58a and 58b) are provided with such an alignment characteristic as to provide a prescribed pretilt angle through the rubbing under a controlled condition. On the other hand, the portions F of the alignment films 55a and 55b formed above the metal electrodes 58a and 58b are provided with such an alignment characteristic as to provide a pretilt angle larger by at least 10 deg., preferably by at least 15 deg. than the prescribed pretilt angle at the pixel regions G on the transparent electrodes 54a and 54b or a homeotropic alignment state, because the surface thereof are roughened by the surface unevenness of the metal electrodes 58a and 58b therebelow (FIG. 15).

A specific example of production of such a liquid crystal device 51 is described hereinbelow.

EXAMPLE 6

A pair of 1.1 mm-thick glass substrates 53a and 53b of 300 mm×320 mm were coated with a ca. 1000 Å-thick ITO film, which was then patterned into 250 pm-wide stripe transparent electrodes 54a and 54b. The stripe transparent electrodes 54a and 54b were then each coated with a ca. 2500 Å-thick Al film by sputtering using an Al target, a supply gas of Ar containing 1% of $O_2$ and a substrate temperature of 250° C., and the Al film was patterned by photolithography into 10 μm-wide stripe metal electrodes 58a (58b) along and on one side each of the transparent electrodes 54a (54b). The surfaces of the metal electrodes 58a and 58b were observed through an electron microscope and subjected to measurement of a surface roughness by a contact stylus-type stepwise difference meter, whereby superface unevennesses of ca. 500 Å in height were found to be formed at a pitch of ca. 600 Å.

The transparent electrodes 54a and 54b together with the metal electrodes 55a and 55b were each coated a ca. 900 Å-thick $Ta_2O_5$ film (not shown) by sputtering.

Then, the insulating films were each coated with a 1.5 wt. %-solution of polyamide acid ("LQ1800", available from Hitachi Kasei K.K.) in an NMP/nBC=1:1 mixture solvent by a spinner at 2000 rpm for 20 sec, followed by baking at 270° C. for ca. 1 hour, to form a ca. 200 Å-thick alignment film 55a (55b), which was then each subjected to rubbing in one direction.

Then, spherical spacer beads 56 were dispersed on one substrate 53a (or 53b), a sealing agent of epoxy resin (not shown) was applied onto a peripheral surface portion of the other substrate 53b (or 53a) by flexography, and the substrates were applied to each other with a prescribed gap of ca. 1.5 μm so that their rubbing directions were identical to each other to form a blank device, which was then filled with a pyrimidine-based mixture liquid crystal 3 showing the following phase transition series to obtain a liquid crystal device 51 as shown in FIG. 15.

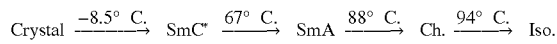

Figure 18:
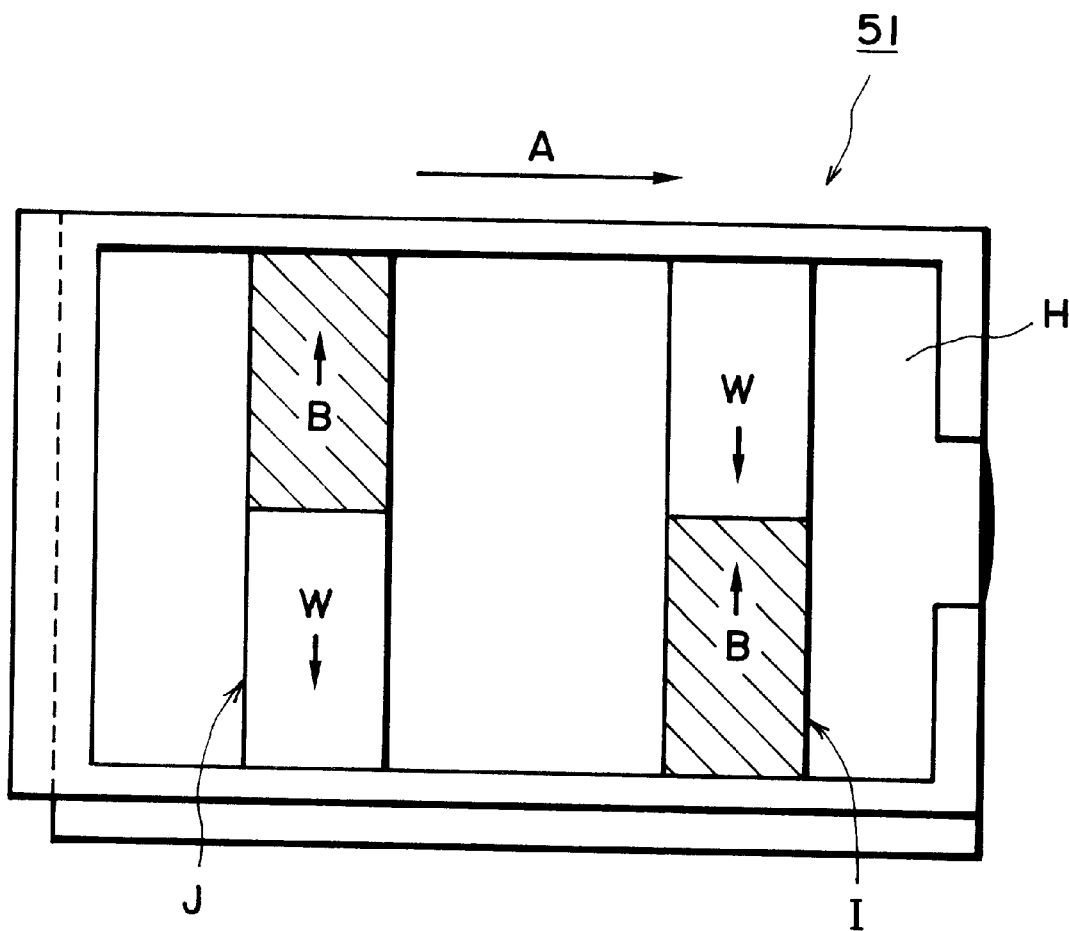
FIG. 18 illustrate a manner of measuring liquid crystal molecular movement in the liquid crystal device of FIG. 15.

In order to evaluate the liquid crystal layer thickness change due to liquid crystal molecular movement, the display area H of the liquid crystal device 51 was written with a display pattern as shown in FIG. 18, including regions I and J which respectively contained a white region (W) and a black region (B) adjacent to each other in mutually different orders in a vertical direction perpendicular to the rubbing direction A (i.e., in a smectic layer extension direction), and all the pixels of the liquid crystal device were subjected to a continual application for ca. 20 hours of rectangular pulses with a pulse width of 25 μsec., a voltage amplitude of 40 volts and a duty of ½. Thereafter, the liquid crystal layer thickness was measured at boundaries between the white and black regions in both regions I and J, whereby no liquid crystal layer thickness change was observed.

As described above, in this embodiment, the metal electrodes 58a and 58b below the alignment films 55a and 55b are provided with surface unevennesses of ca. 100–1000 Å in height to provide a larger pretilt angle above the metal electrodes than at the pixel regions or a homeotropic alignment state above the metal electrodes. As a result, the occurrence of a pressure distribution due to liquid crystal molecular movement can be alleviated in a small area (e.g., for each pixel region by provision of such a higher pretilt or homeotropic alignment region surrounding each pixel region), whereby the liquid crystal layer thickness change can be effectively suppressed.

Further, as the surfaces of the metal electrodes 58a and 58b are provided with such unevennesses during the formation of the metal electrodes, no specific step for providing the locally different alignment characteristic is required.

For comparison with the above example, a comparative liquid crystal device was prepared in the same manner as in Example 6 except that the Al film to be patterned into metal electrodes was formed by sputtering only Ar as the supply gas and without heating the substrate. The surfaces of the metal electrodes 58a and 58b were observed through an electron microscope and a surface roughness measurement by a contact stylus-type stepwise difference meter, whereby unevennesses of ca. 50 Å were found to be found on the metal electrodes.

The comparative liquid crystal device was subjected to measurement of the liquid crystal layer thickness change in the same manner as in Example 6, whereby the liquid crystal layer thickness was formed to have increased by ca. 42% at the white (W)—black (B) boundary in the region I and have decreased by ca. 37% at the white (W)—black (B) boundary in the region J.

In the above-described 10th embodiment, the surface unevennesses of the metal electrodes 58a and 58b have been provided by sputtering of Al by using a supply gas containing a small amount of $O_2$ in Ar, but may also be provided by coating metal electrodes or a metal film therefor with a film of ZnO formed at a relatively low degree of vacuum or by etching or heat-treatment of once-formed metal electrodes or a precursor film therefor.

Figure 19:
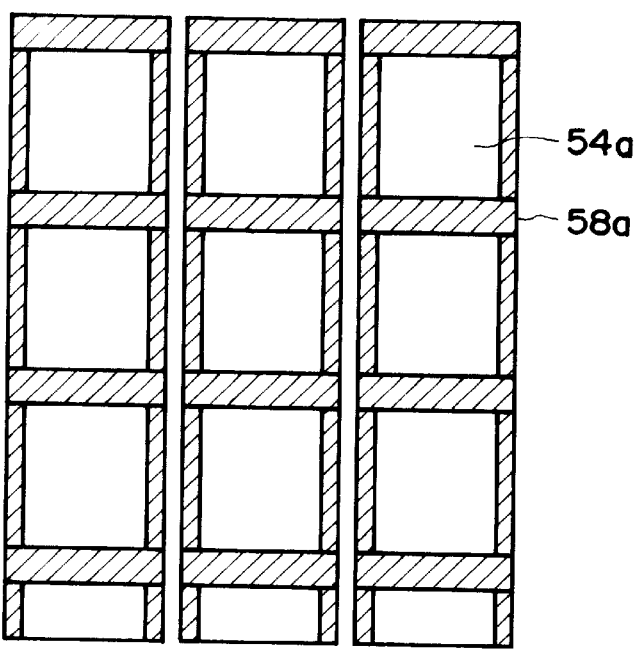
FIGS. 19 and 20 are plan views showing electrode patterns on a single substrate and a pair of substrates, respectively, for a liquid crystal device according to an eleventh embodiment of the invention.
Figure 20:
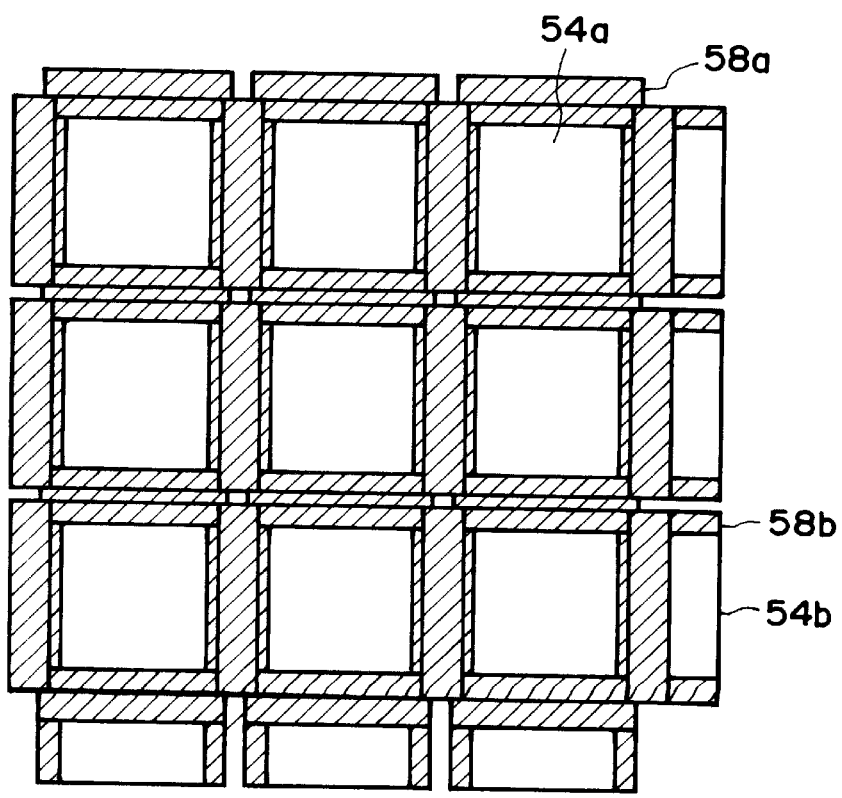

FIG. 19 is a plan view showing an electrode pattern on one substrate (53a) to be used in a liquid crystal device according to an 11th embodiment, wherein stripe-shaped transparent electrodes 54a are provided with ladder-shaped metal electrodes 58a, and a pair of such substrates (53a and 53b) are applied to each other so that their transparent electrodes 54a and 54b provided with metal electrodes 58a and 58b intersect each other at right angles as show in FIG. 20. The transparent electrodes 54a, 54b, the metal electrodes 58a, 58b and other structures may be formed in the same manner as in the 10th embodiment. By using such ladder-shaped metal electrodes 58a and 58b, almost all the pixel-spacing region may be covered without using an additional black matrix shade member.

By forming such ladder-shaped metal electrodes 58a and 58b on transparent electrodes 54a and 54b, each pixel region may be surrounded by an outside-pixel region where metal electrodes are disposed opposite to each other and an alignment state closer to a homeotropic alignment state (i.e., a more isotropic alignment state) is provided, so that the local pressure distribution due to liquid crystal molecular movement is further alleviated to suppress the liquid crystal layer thickness change.

As described above, according to the 10th and 11th embodiments of the present invention, at least a portion of the surface of the metal electrodes formed along transparent electrodes is roughened, so that a larger pretilt or homeotropic alignment state is provided above the metal electrodes compared with that above the portion of the transparent electrodes (i.e., the pixel region), the local pressure distribution is alleviated in a smaller region, so that the liquid crystal layer thickness change can be suppressed regardless of a display pattern to provide a liquid crystal device with a good switching characteristic and without alignment deterioration.

Figure 21:
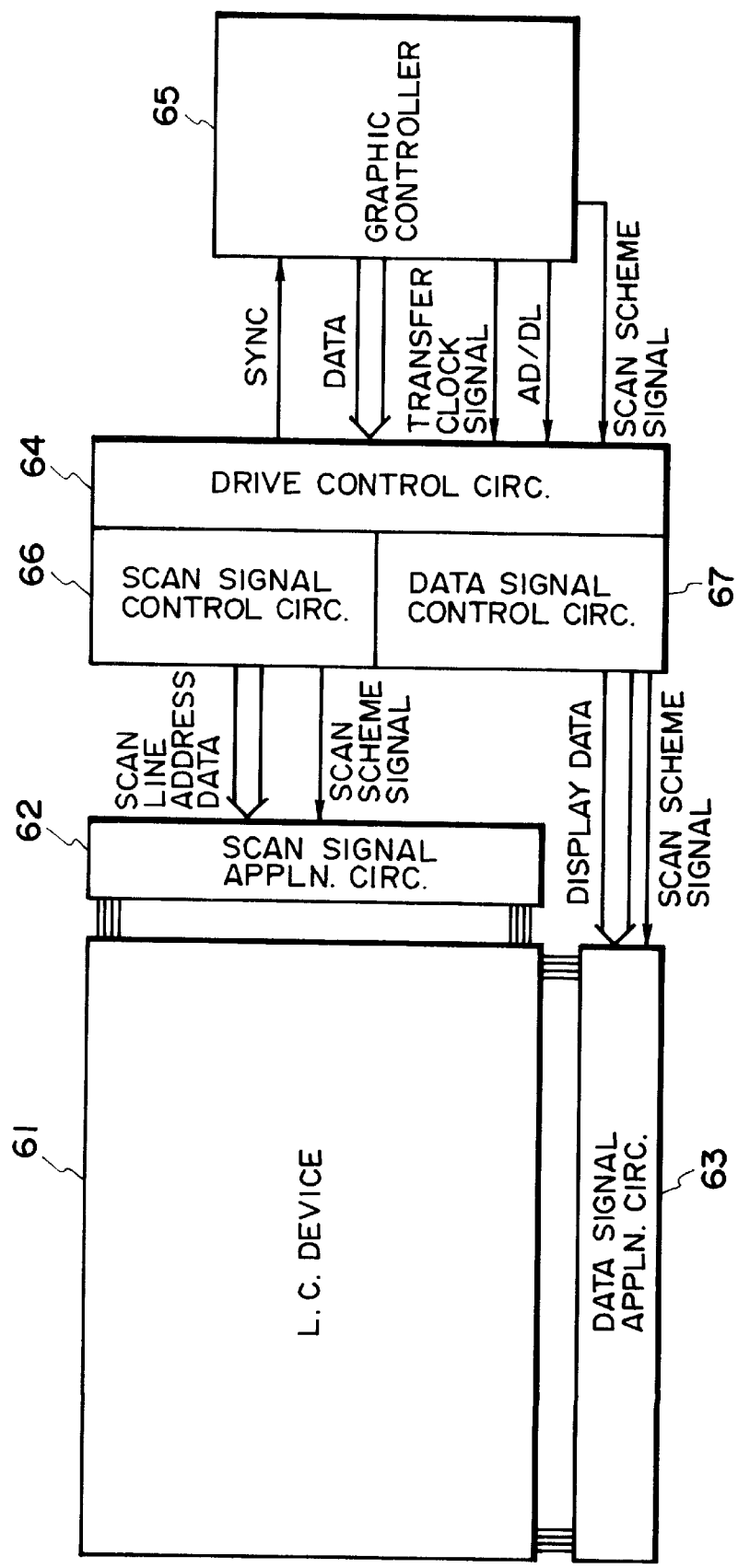
FIG. 21 is a block diagram of a data transmission apparatus including a liquid crystal device according to the invention.
Figure 22:
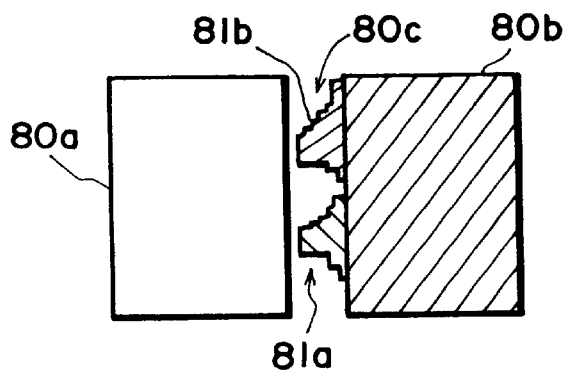
FIG. 22 is a schematic illustration of a mixture of white and black domains at an outside-pixel region in a known liquid crystal device.
Figure 23:
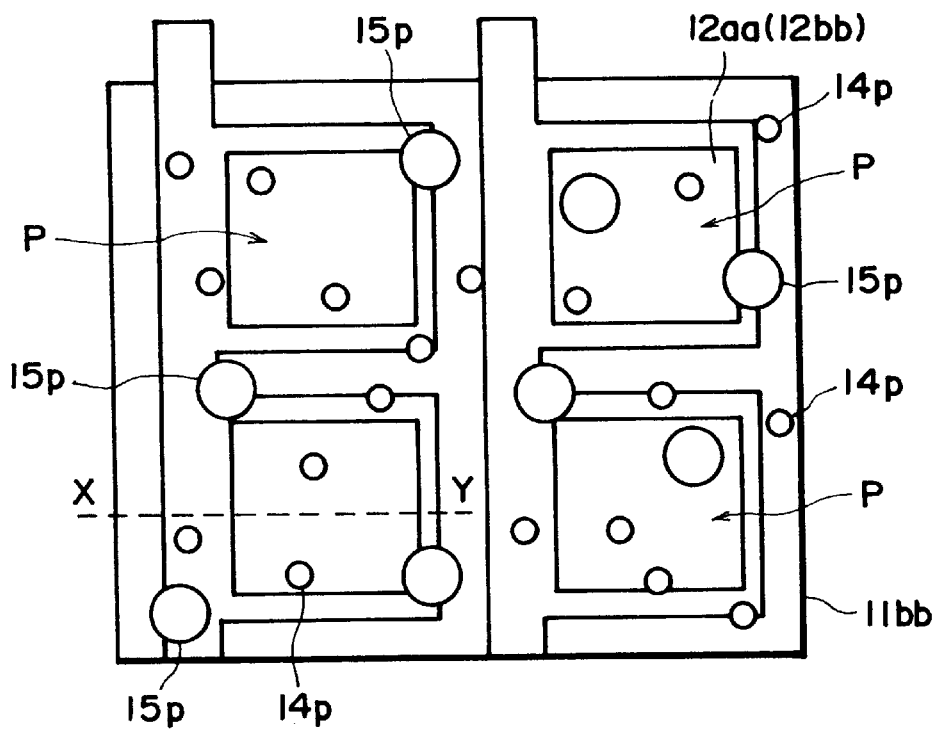
FIG. 23 is a plan view showing an example of pixel arrangement in a known liquid crystal device.
Figure 24:
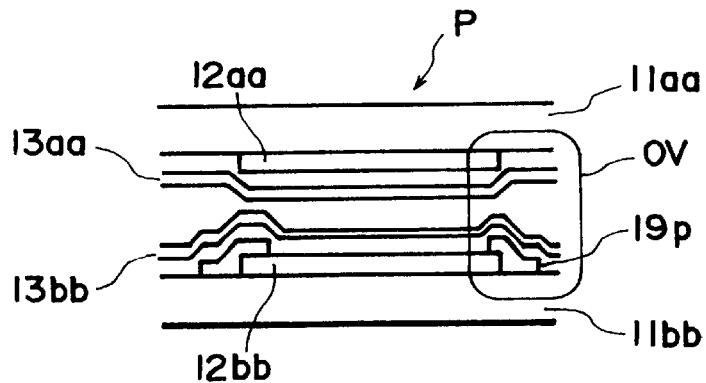
FIG. 24 is a sectional view taken along a line X-Y in FIG. 23.

A liquid crystal device according to the present invention may for example be incorporated in a data transmission apparatus having an organization as illustrated by a block diagram of FIG. 21.

Referring to FIG. 21, a data transmission apparatus, such as a printer or a color display apparatus, may include a liquid crystal device 61 as described above according to the present invention, to which are connected a scanning signal application circuit 62 and a data signal application circuit 63 which are sequentially connected to a scanning signal control circuit 66 and a data signal control circuit 67, a drive control circuit 64 and then to a graphic controller 65. From the graphic controller 65, video data and a scanning scheme signal are supplied to the scanning signal control circuit 66 and the data signal control circuit 67 via the drive control circuit 64.

The video data is converted into scanning line address data and display data by the scanning signal control circuit 66 and the data signal control circuit 67, and the scanning scheme signal is supplied as it is to the data signal application circuit 62 and the data signal application circuit 63.

The scanning signal application circuit 62 applies a scanning signal determined by the scanning scheme signal to the scanning electrodes in a sequence determined by the scanning line address data, and the data signal application circuit 63 applies data signals having waveforms determined by a combination of the display data determining white or black display states and the scanning scheme signal to the respective data electrodes.

What is claimed is:

1. A liquid crystal device, comprising: a pair of substrates and a liquid crystal disposed between the substrates; said pair of substrates being provided with an alignment film uniaxially treated by rubbing for providing a prescribed alignment state of the liquid crystal, and at least two groups of electrodes intersecting each other so as to form a plurality of pixels each at an intersection of the electrodes, and an outside-pixel region separating the pixels from each other, each pixel being provided with a pixel region formed by the liquid crystal and a pair of opposing electrodes sandwiching the liquid crystal so as to apply a drive voltage for causing an optical state change of the liquid crystal, wherein the outside-pixel region retaining the liquid crystal is provided with a projecting structure comprising a plurality of discrete projections disposed between an adjacent pair of pixel regions so as to provide a weaker rubbing effect and a homeotropic alignment effect to the liquid crystal at the outside-pixel region than in the pixel regions.

2. A liquid crystal device according to claim 1, wherein at least one of the substrates is provided with a color filter at the pixel region in addition to the projecting structure at the outside-pixel region.

3. A liquid crystal device according to claim 2, wherein said projecting structure is composed of a material identical to that of the color filter.

4. A liquid crystal device according to claim 1, wherein said projecting structure occupies an area which is 4–50% of the outside-pixel region.

5. A liquid crystal device according to claim 1, wherein said projecting structure is disposed at the outside-pixel region on at least one of the substrates and composed of a colored resin capable of optical shading and boding the substrates.

6. A liquid crystal device according to claim 5, wherein said projecting structure occupies an area which is 4–50% of the outside-pixel region.

7. A liquid crystal device according to claim 5, wherein said projecting structure is formed as unevennesses formed on a shade layer formed at the outside-pixel region.

8. A liquid crystal device according to claim 1, wherein the outside pixel region is also provided with an alignment film and provided with a weaker rubbing effect than in the pixel region.

9. A liquid crystal device according to claim 1, wherein the liquid crystal is movable between the adjacent pair of pixel regions via the outside pixel region.

* * * * *

UNITED STATES PATENT AND TRADEMARK OFFICE
CERTIFICATE OF CORRECTION

PATENT NO. : 6,320,639 B1
DATED : November 20, 2001
INVENTOR(S) : Sunao Mori et al.

It is certified that error appears in the above-identified patent and that said Letters Patent is hereby corrected as shown below:

Title page,
Item [56], FOREIGN PATENT DOCUMENTS

| "57113265 | | -- 57-113265 |
|---|---|---|
| 62144133 | | 62-144133 |
| 03249623 | | 03-249623 |
| 4127126 | should read | 41-27126 |
| 05005886 | | 05-005886 |
| 5102754 | | 51-02754 |
| 07092467" | | 07-092467 --. |

Item [57], ABSTRACT, line 4, "region in" should read -- region is --.

Column 3,
Line 21, "in" should read -- is --;
Line 57, "angle a" should read -- angle $\alpha$ --.

Column 4,
Line 8, "a denotes" should read -- $\alpha$ denotes --.

Column 9,
Line 19, "for" should read -- form --.

Column 14,
Line 26, "an" should read -- and --

Column 18,
Line 55, "magnifications" should read -- magnification --.

UNITED STATES PATENT AND TRADEMARK OFFICE
CERTIFICATE OF CORRECTION

PATENT NO.   : 6,320,639 B1
DATED        : November 20, 2001
INVENTOR(S)  : Sunao Mori et al.

It is certified that error appears in the above-identified patent and that said Letters Patent is hereby corrected as shown below:

Column 19,
Line 48, "250pm-wide" should read -- 250 µm-wide --.

Column 22,
Line 46, "boding" should read -- bonding --.

Signed and Sealed this

Twenty-first Day of May, 2002

Attest:

Attesting Officer

JAMES E. ROGAN
Director of the United States Patent and Trademark Office